United States Patent [19]
Saunders

[11] Patent Number: 5,208,667
[45] Date of Patent: May 4, 1993

[54] MOTION COMPENSATED VIDEO STANDARDS CONVERTER AND METHOD OF DERIVING MOTION VECTORS

[75] Inventor: Nicholas I. Saunders, Basingstoke, United Kingdom

[73] Assignee: Sony Broadcast & Communications Limited, Basingstoke, United Kingdom

[21] Appl. No.: 713,988

[22] Filed: Jun. 12, 1991

[30] Foreign Application Priority Data

Jul. 24, 1990 [GB] United Kingdom ............... 9016167

[51] Int. Cl.$^5$ .................. H04N 7/01; H04N 7/18; H04N 7/12
[52] U.S. Cl. .................. 358/140; 358/105; 358/136
[58] Field of Search ........... 358/105, 135, 136, 140

[56] References Cited

U.S. PATENT DOCUMENTS

| | | | |
|---|---|---|---|
| 4,890,160 | 12/1989 | Thomas | 358/105 |
| 4,974,084 | 11/1990 | Fernando | 358/105 |
| 5,012,336 | 4/1991 | Gillard | 358/105 |
| 5,012,337 | 4/1991 | Gillard | 358/105 |
| 5,025,495 | 6/1991 | Avis | 358/140 |
| 5,027,203 | 6/1991 | Samad et al. | 358/105 |
| 5,099,325 | 3/1992 | Artieri et al. | 358/105 |

Primary Examiner—John K. Peng
Attorney, Agent, or Firm—William S. Frommer; Alvin Sinderbrand

[57] ABSTRACT

In, for example, a motion compensated video standards converter wherein blocks in a first field or frame of a video signal are each compared with a plurality of blocks in the following field or frame of the video signal for deriving motion vectors representing the motion of the content of respective blocks between the first field or frame and the following field or frame, and wherein a correlation surface is generated for each block in the first field or frame, the correlation surface representing the difference between the content of the first block in the first field or frame and the content of each block in the following field or frame with which it has been compared; the minimum difference represented by the correlation surface and differing from the next smallest difference represented by the correlation surface by more than a predetermined threshold value is found to derive a motion vector, the number of motion vectors so derived is averaged (62) over a predetermined number of fields or frames, and the threshold value is varied (67, 68, 69) in dependence on the average.

10 Claims, 16 Drawing Sheets

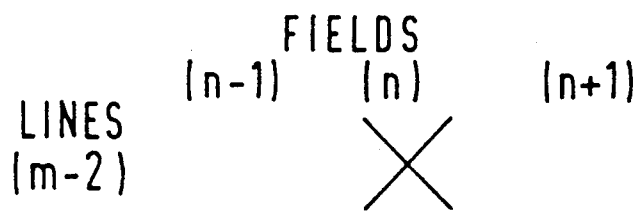
FIG. 2.
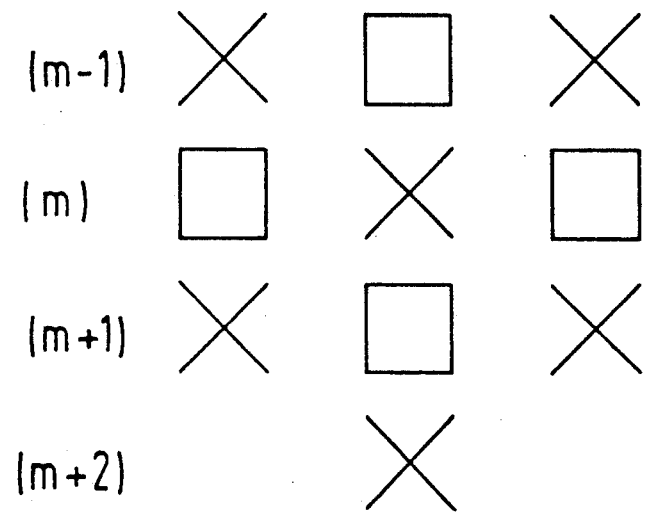
FIG. 4.
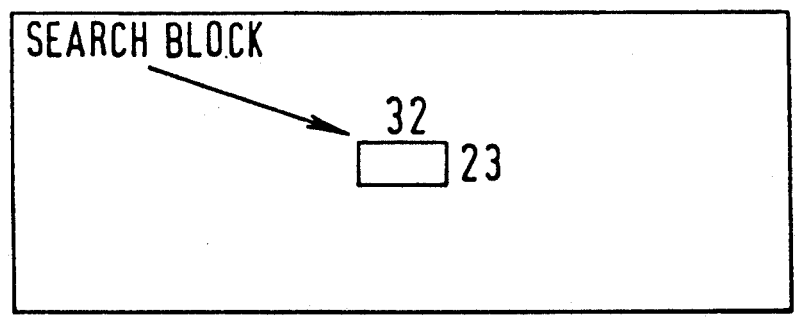
FRAME N
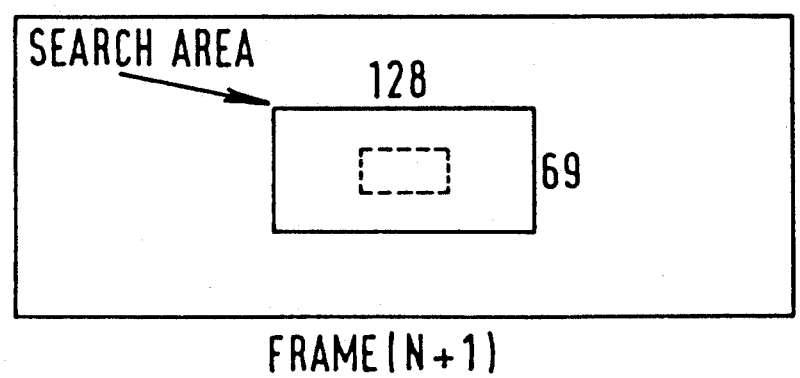
FRAME (N+1)

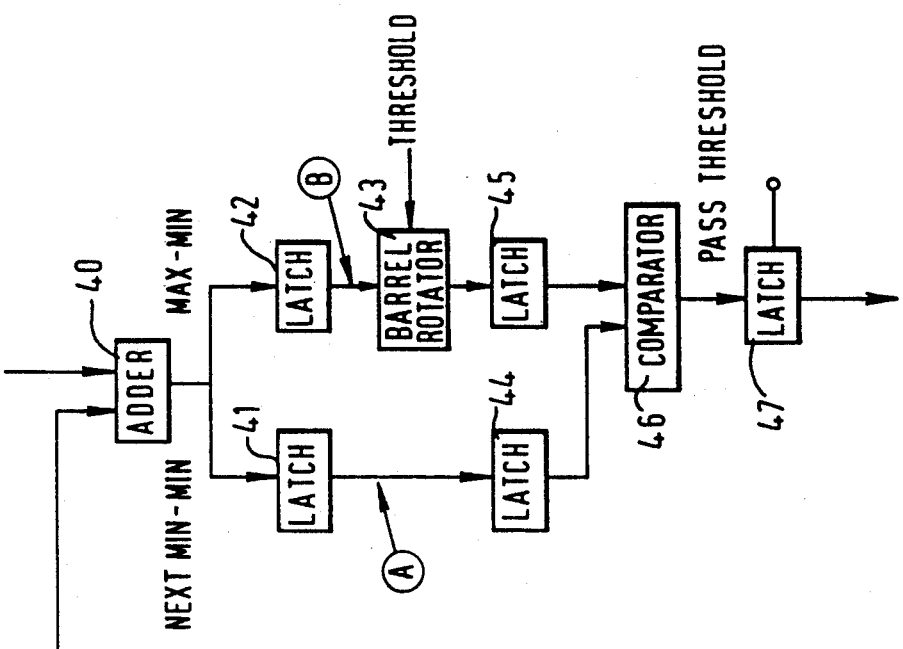
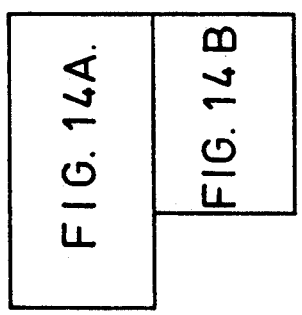

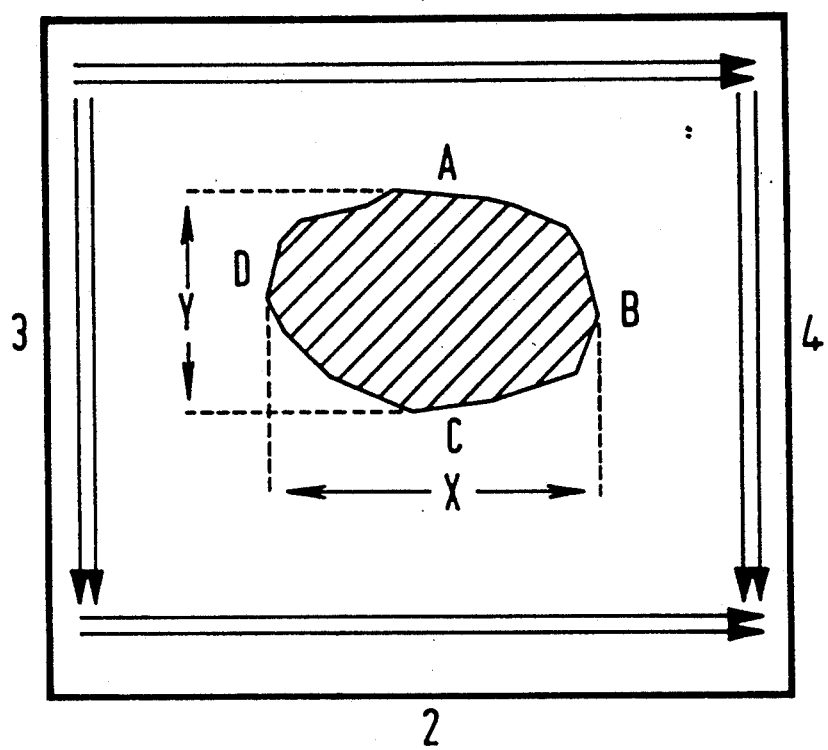
FIG. 17.
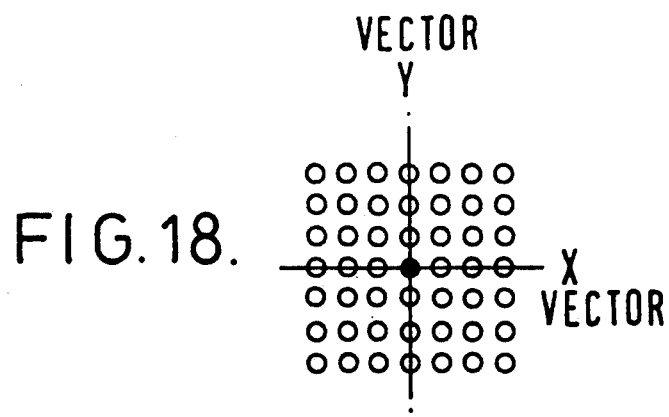
FIG. 18.
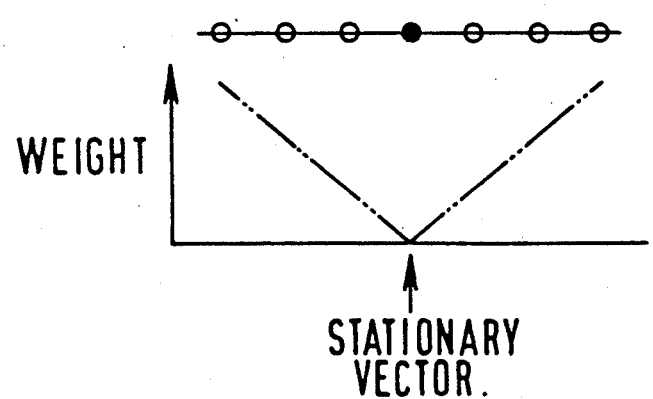

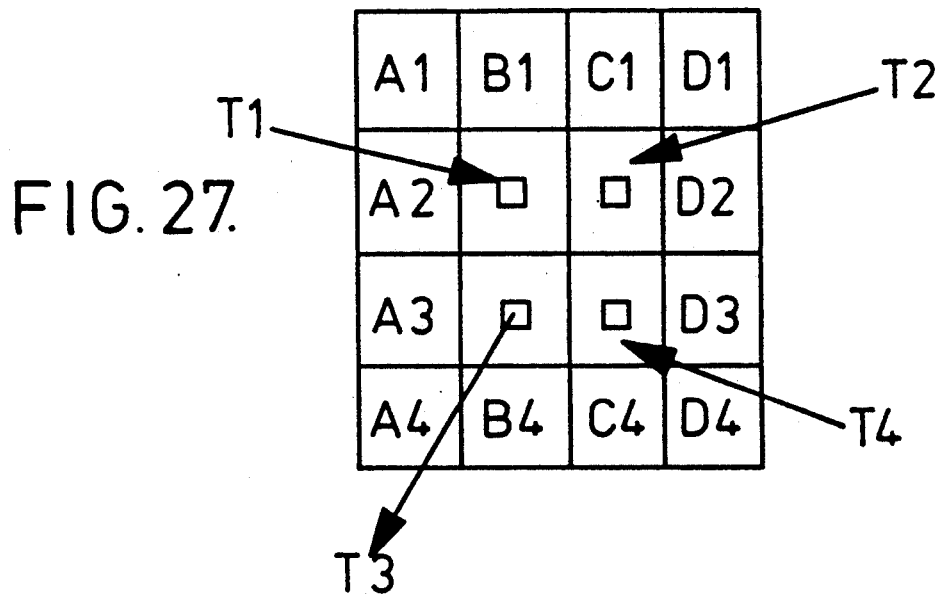
FIG. 27.
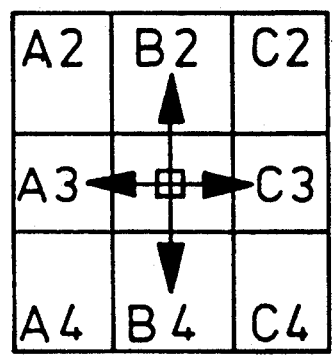
FIG. 28.
FIG. 29.
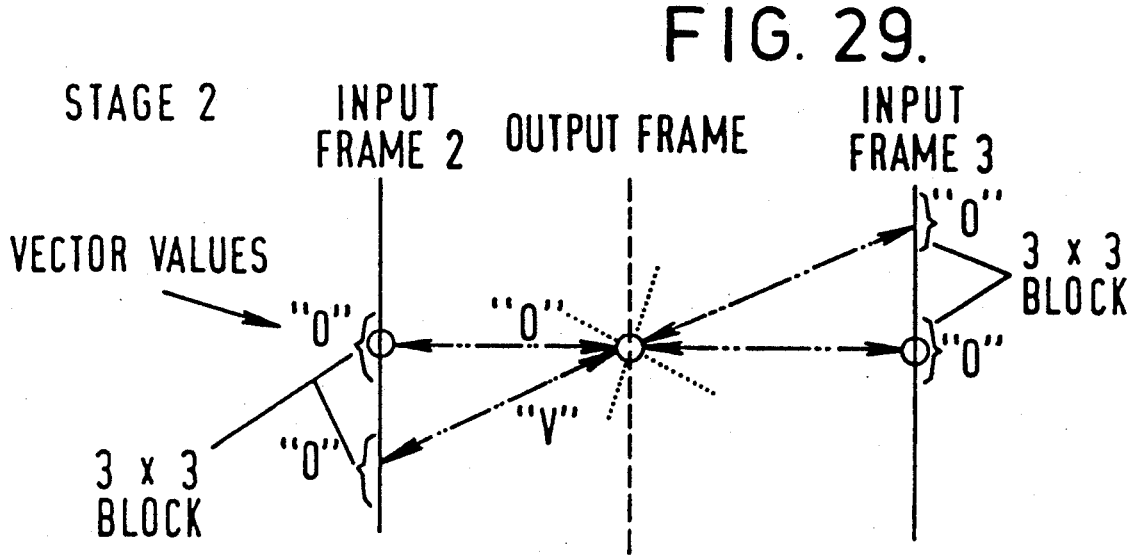

MOTION COMPENSATED VIDEO STANDARDS CONVERTER AND METHOD OF DERIVING MOTION VECTORS

BACKGROUND OF THE INVENTION

1. Field of the Invention

This invention relates to motion dependent video signal processing. More particularly, the invention relates to video standards converters using such signal processing, and to methods of deriving motion vectors representing motion between fields or frames of a video signal.

2. Description of the Prior Art

Video standards converters are well known devices used to convert video signals from one standard to another, for example, from a 625 lines per frame, 50 fields per second standard to a 525 lines per frame, 60 fields per second standard. Video standards conversion cannot be achieved satisfactorily merely by using simple linear interpolation techniques, because of the temporal and vertical alias which is present in a video signal. Thus, simple linear interpolation produces unwanted artifacts in the resulting picture, in particular, the pictures are blurred vertically and judder temporally.

To reduce these problems it has been proposed that video standards converters should use adaptive techniques to switch the parameters of a linear interpolator in dependence on the degree of movement in the picture represented by the incoming video signal.

It has also been proposed for example for the purpose of data reduction in video signal processing, to generate motion vectors from an incoming video signal by a block matching technique, in which the content of a search block in one field or frame is compared with the respective contents of a plurality of search blocks comprised in a search area in the following field or frame, to determine the minimum difference between the contents so compared, and hence the direction and distance of motion if any) of the content of the original search block.

Our European patent specification EP-A2-0 395 268, for example, discloses a motion compensated video standards converter wherein blocks in a first field or frame of a video signal are compared with a plurality of blocks in a following field or frame of the video signal for deriving motion vectors representing the motion of the content of respective blocks. The motion vectors are derived by a motion vector estimator wherein the results of the motion vector estimation are compared with a threshold for checking the validity of the motion vectors being derived. This threshold is chosen from experience and remains unaltered for an entire program sequence.

A problem with this technique is that the threshold is necessarily a compromise chosen to yield the best results with the average scene content of the program sequence. For some video material, therefore, the threshold may be too hih, so too few motion vectors pass the threshold test and the choice of motion vectors available for selection in the subsequent stage is restricted. Conversely, for other material, the threshold may be too low, so too many motion vectors pass the threshold test, and the motion vectors passing to the subsequent stage have an undesirable level of uncertainty.

SUMMARY OF THE INVENTION

One object of the present invention is to provide an improved motion compensated video standards converter.

Another object of the present invention is to provide a motion compensated video standards converter with improved selection of motion vectors.

Another object of the present invention is to provide an improved method of selecting motion vectors representing motion between successive fields or frames of a video signal.

According to the present invention there is provided a motion compensated video standards converter comprising: means for comparing blocks in a first field or frame of a video signal with a plurality of blocks in the following field or frame of the video signal for deriving motion vectors representing the motion of the content of respective said blocks between said first field or frame and said following field or frame, by generating a respective correlation surface for blocks in said first field or frame, said correlation surface representing the difference between the content of the said block in said first field or frame and the content of each block in said following field or frame with which it has been compared; means to determine from said correlation surface the motion vector corresponding to the minimum value of said difference, by determining the minimum difference represented by said correlation surface which differs from the next smallest difference represented by said correlation surface by more than a predetermined threshold value; means to average the number of said motion vectors so determined over a predetermined number of fields or frames; means to vary said threshold value in dependence on said average; and an interpolator controlled in dependence on said motion vectors.

According to the present invention there is also provided a method of deriving motion vectors representing motion between successive fields or frames of a video signal, the method including the steps of: comparing blocks in a first field or frame of the video signal with a plurality of blocks in the following field or frame of the video signal for deriving motion vectors representing the motion of the content of respective said blocks between said first field or frame and said following field or frame; generating a correlation surface for each said block in said first field or frame, said correlation surface representing the difference between the content of the said block in said first field or frame and the content of each block in said following field or frame with which it has been compared; determining from said correlation surface the motion vector corresponding to the minimum value of said difference, by determining the minimum difference represented by said correlation surface which differs from the next smallest difference represented by said correlation surface by more than a predetermined threshold value; averaging the number of said motion vectors so determined over a predetermined plurality of fields or frames; and varying said threshold value in dependence on said average.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 shows diagrammatically progressive scan conversion;

FIGS. 4 and 5 show diagrammatically search blocks and search areas, and the relationships therebetween;

FIGS. 14A and 14B show part of the embodiment in more detailed block diagrammatic form;

FIG. 17 shows diagrammatically how the direction in which a search block is to grow is determined;

FIG. 18 shows diagrammatically how a correlation surface is weighted;

FIGS. 27 and 28 show diagrammatically how a threshold is established during the motion vector selection;

FIG. 29 shows diagrammatically a second stage in motion vector selection;

DESCRIPTION OF THE PREFERRED EMBODIMENTS

The embodiment of motion compensated video standards converter to be described is particularly intended for use in the conversion of a high definition video signal (HDVS) having 1125 lines per frame, 60 fields per second, to 24 frames per second 35 mm film. However, it will be understood that the invention is not limited in this respect, and that the standards converter can readily be adapted to effect conversions between other standards.

Figure 1:
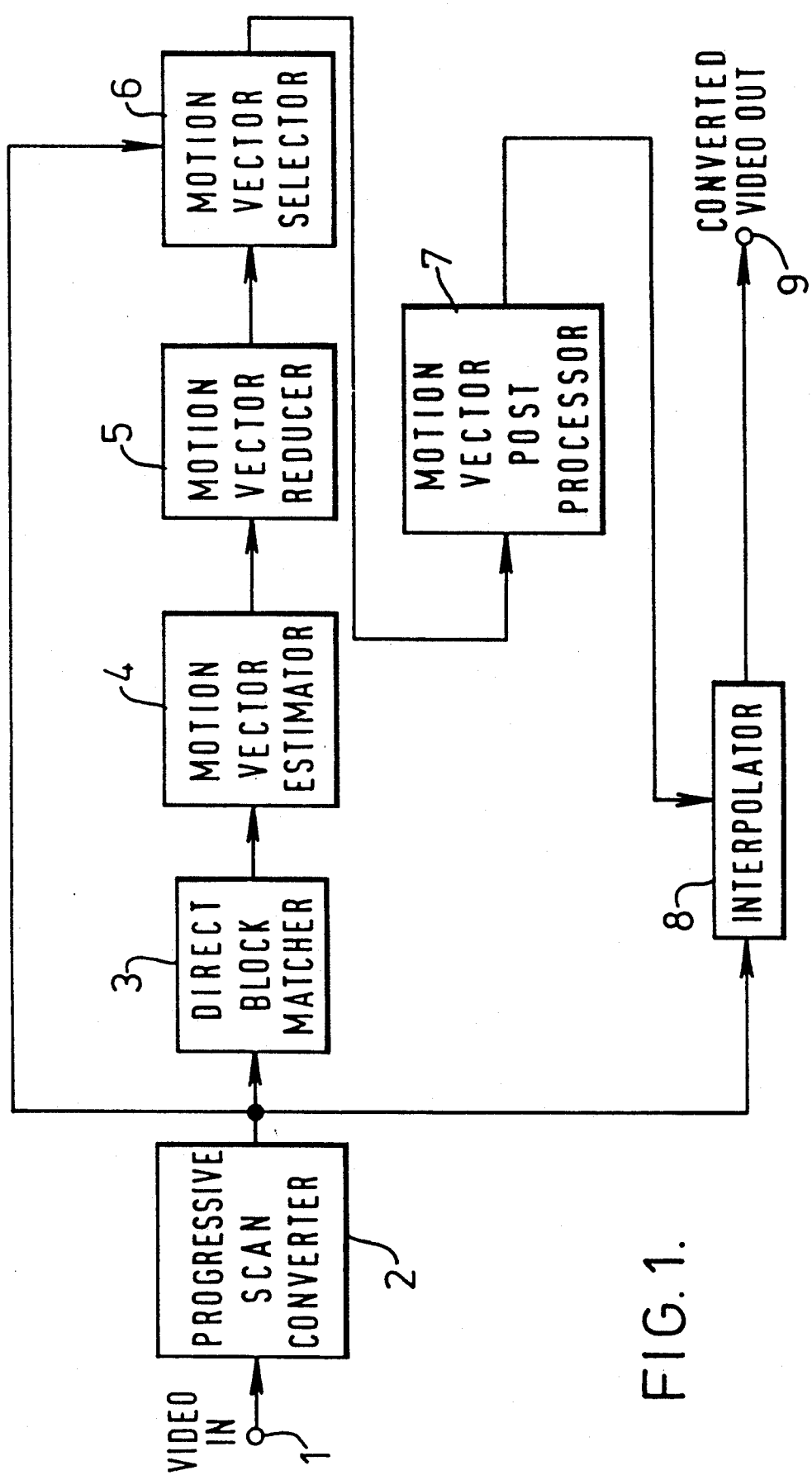
FIG. 1 is a block diagram of an embodiment of motion compensated video standards converter according to the present invention.

FIG. 1 is a block diagram of the standards converter. The standards converter comprises an input terminal 1 to which an input video signal is supplied. The input terminal is connected to a progressive scan converter 2 in which the input video fields are converted into video frames which are supplied to a direct block matcher 3 wherein correlation surfaces are created. These correlation surfaces are analysed by a motion vector estimator 4, which derives and supplies motion vectors to a motion vector reducer 5, wherein the number of motion vectors for each pixel is reduced, before they are supplied to a motion vector selector 6, which also receives an output from the progressive scan converter 2. Any irregularity in the selection of the motion vectors by the motion vector selector 6 is removed by a motion vector post processor 7, from which the processed motion vectors are supplied to and control an interpolator 8 which also receives an input from the progressive scan converter 2. The output of the interpolator 8, which is a standards-converted and motion-compensated video signal is supplied to an output terminal 9. Each part of the standards converter and the operation thereof will be described in more detail below.

The progressive scan converter 2 produces output frames at the same rate as the input fields. Thus, referring to FIG. 2 which shows a sequence of consecutive lines in a sequence of consecutive fields, the crosses representing lines present in the input fields and the squares representing interpolated lines, each output frame will contain twice the number of lines as there are in an input field, the lines alternating between lines from the input video signal and lines which have been interpolated by one of the methods to be described below. The interpolated lines can be regarded as an interpolated field of the opposite polarity to the input field, but in the same temporal position. Progressive scan conversion is carried out for two main reasons; firstly, to make the following direct block matching process easier, and secondly in consideration of the final output video format.

Concerning direct block matching, this is used to obtain an accurate estimation of the horizontal and vertical motion between two successive video fields, as described in more detail below. However, it can be shown that if progressive scan conversion is not first effected, problems will arise due to the interlaced structure of the video signal on which direct block matching is performed.

Concerning consideration of the final output video format, in the case of the present embodiment, the converted video is supplied via tape to an electron beam recorder, and needs to consist of frames corresponding to the motion picture film rate of 24 frames per second. For this reason, therefore, the production of progressive scan converted frames is necessary, and moreover the progressive scan converted frames can also be used as a fall-back in the case where motion compensated standards conversion is deemed to be producing unacceptable results, for example, where the motion is too diverse to be analysed satisfactorily. In that case the use of the nearest progressive scan converted frame as the required output frame can produce reasonably acceptable results.

Figure 3:
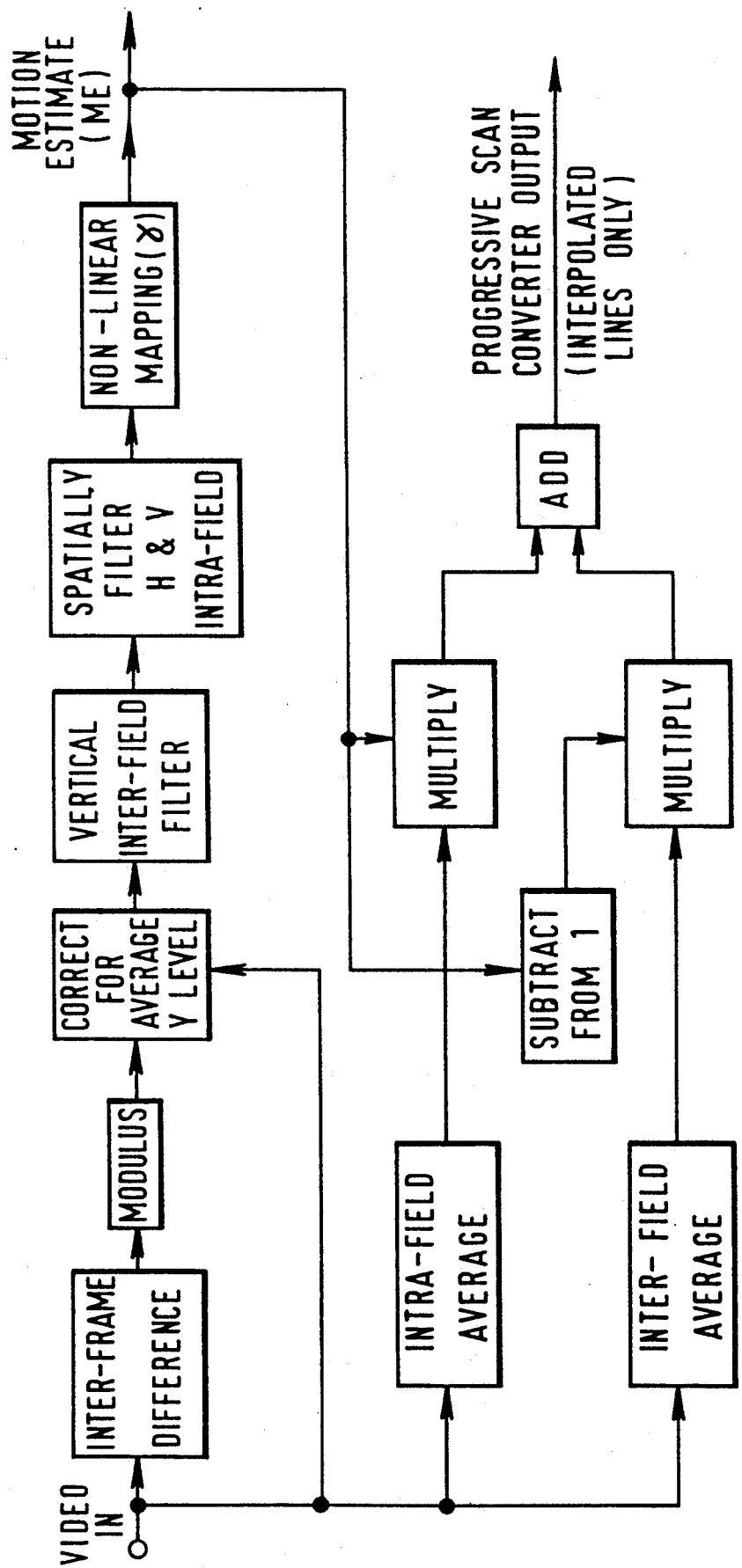
FIG. 3 is a block diagram showing the steps in motion adaptive progressive scan conversion.

Progressive scan conversion can be carried out in a number of ways such as by previous field replacement, median filtering in which three spatially consecutive lines are examined (temporally these three lines will come from two consecutive fields), or a motion compensated technique which utilizes multi-gradient motion detection followed by multi-direction linear interpolation. However, in the present embodiment the preferred method is motion adaptive progressive scan conversion, the steps of which are indicated in the block diagram of FIG. 3. The concept is to use inter-field interpolation in wholly static picture areas to retain as much vertical information as possible, and to use intra-field interpolation when significant motion is present. This also aids smooth portrayal of motion. In scenes where the motion is somewhere between these two extremes, an estimate of the local motion present in the picture is made, and this is then used to mix together different proportions of inter- and intra-field interpolation. This is described in more detail in the above-mentioned European patent specification.

Referring back to FIG. 1, the frames of video derived by the progressive scan converter 2 are used to derive motion vectors. The estimation of motion vectors consists of two steps. Firstly, correlation surfaces are generated by correlating search blocks from consecutive frames. Then, having obtained these correlation surfaces, they have to he examined to determine the position or positions at which correlation is best. Several different methods of obtaining a correlation surface exist, the two main methods being phase correlation and direct block matching. There are, however, a number of problems associated with the use of phase correlation, these being very briefly problems relating to the transform mechanism, the windowing function, the block size and the variable quality of the contour of the surface produced. In the present embodiment therefore, direct block matching is preferred.

The direct block matcher 3 operates as follows. Two blocks respectively comprising a rectangular array of pixels from consecutive frames of the progressive scan converted video signal are correlated to produce a correlation surface from which a motion vector is derived.

Figure 5:
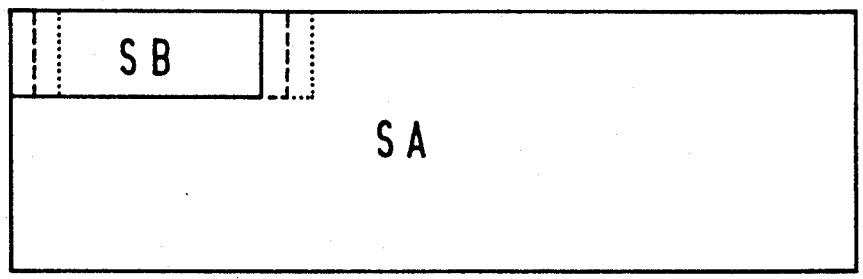
Figure 6:
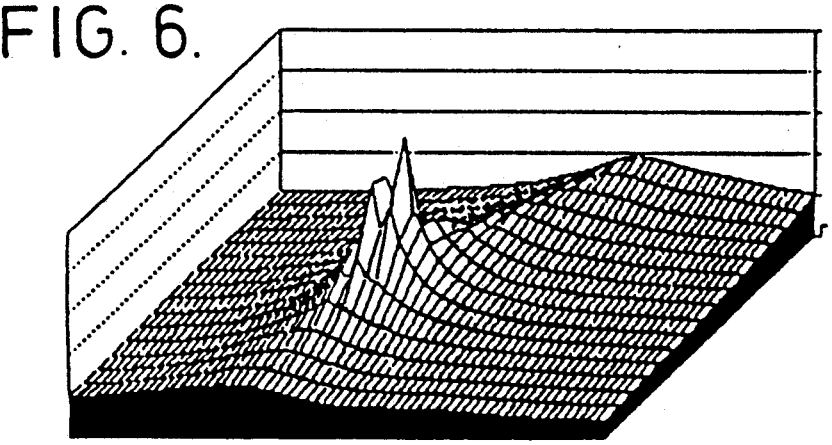
FIG. 6 shows a correlation surface.

Referring to FIG. 4, firstly a small block called a search block of size 32 pixels by 23 lines is taken from a frame as shown in FIG. 4. Then a larger block called a search area of size 128 pixels by 69 lines is taken from the next frame. The search block (SB) is then placed in each possible position in the search area (SA) as shown in FIG. 5, and for each location the sum of the absolute difference of pixel luminance levels between the two blocks is calculated. This value is then used as the height of the correlation surface at the point at which it was derived. It can then be used in conjunction with other similarly derived values for each possible location of the search block in the search area to obtain a correlation surface, an example of which is shown in FIG. 6. For clarity the surface is shown inverted, and as it is in fact the minimum that is required, the required point in FIG. 6 is the main peak.

The size of the search block is selected by examining the minimum size of an object that may require motion compensation. For PAL 625 lines per frame, 50 fields per second signals a search block of 16 pixels by 8 lines has been found suitable for tracking a small object without allowing any surrounding information not within the object, but still within the search block, to affect the tracking of the object. This approach has therefore been adopted in the present embodiment, but modified to take account of the different numbers of active pixels per line, active lines per frame, and aspect ratio of a HDVS as compared with PAL 625/50. The comparative figures, the HDVS being put first, are as follows; 1920 (720) active pixels per line, 1035 (575) active lines per frame, 3:5.33 (3:4) aspect ratio.

It should be added that there is an argument for using a larger search block, since this means that a large object can be tracked. On the other hand, there exists an argument for using a smaller search block, to prevent a small object being over-shadowed by the effect of a large object or background area. Also, however, there is the advantage that with small search blocks there is no requirement for the derivation of more than one motion vector from each of them. Because having a single motion vector is so much easier than having more than one, the present embodiment starts with a small search block as described above, and then causes the search block to grow into a bigger search block if no satisfactory result has been obtained. This then encompasses the advantages of both a small and a large search block. The criteria for a satisfactory result is set by the motion vector estimator 4 (FIG. 1) referred to in more detail below and which determines the motion vector from a given correlation surface.

This technique of causing the search block to grow is not only advantageous for tracking large objects. It can also be shown to help track the movement of an object having the shape of a regular pattern of a periodic nature.

The search block, and the search area, can both be grown horizontally or vertically, or indeed in both directions, if the correlation surface suggests it.

From the correlation surface (FIG. 6) generated for each search block in a frame the motion vector estimator 4 (FIG. 1) deduces the likely inter-frame motion between the search block and its corresponding search area. It should again be mentioned that for clarity all diagrams of correlation surfaces are shown inverted, that is, such that a minimum is shown as a peak.

The motion vector estimator 4 (FIG. 1) uses motion vector estimation algorithms to detect the minimum point on each correlation surface. This represents the point of maximum correlation between the search block and the search area, and hence indicates the probable motion between them. The displacement of this minimum on the correlation surface with respect to the origin, in this case the centre of the surface, is a direct measurement, in terms of pixels per frame, of the motion. For the simplest case, where the correlation surface contains a single, distinct minimum, the detection of the minimum point on the correlation surface is sufficient to determine accurately the motion between the search block and the search area. As previously mentioned, the use of small search blocks improves the detection of motion and the accuracy of motion estimation, but unfortunately small single search blocks are unable to detect motion in a number of circumstances which will now be described.

Figure 7:
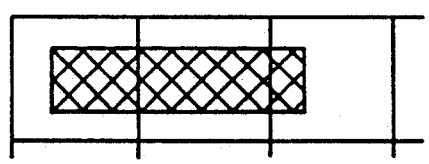
FIG. 7 shows diagrammatically a moving object straddling three search blocks.
Figure 7:
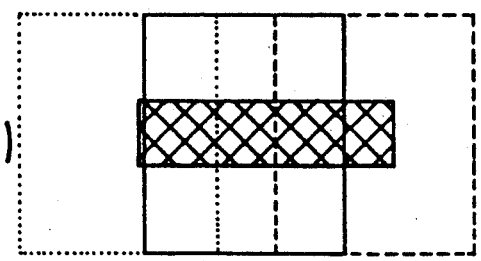
Figure 8:
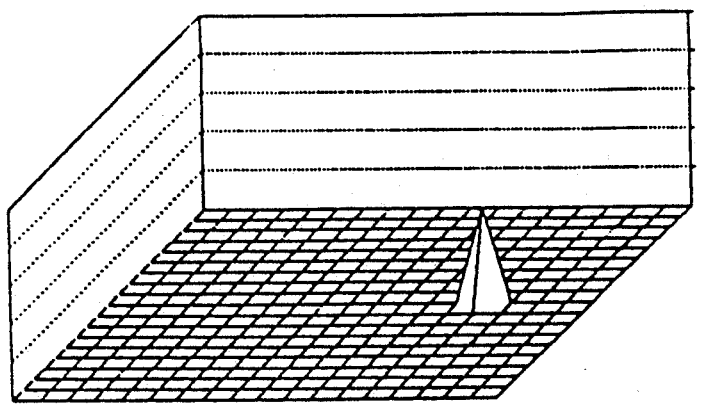
FIGS. 8 to 10 show three resulting correlation surfaces, respectively.
Figure 9:
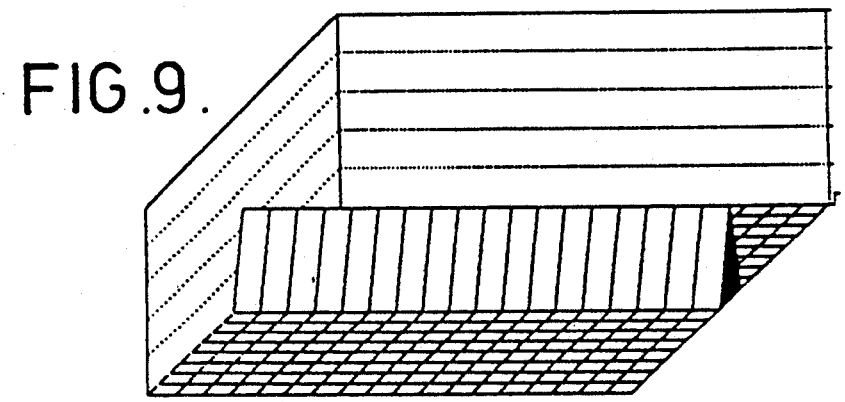

FIG. 7 shows an object with motion vectors (5, 0) straddling three search blocks 1A, 2A and 3A in a frame (t). When the search blocks 1A and 3A are correlated with respective search areas (1B and 3B) in the next frame (t+1) a correlation surface shown in FIG. 8 results showing a minimum at (5, 0). (This assumes a noiseless video source.) However, when the search block 2A is correlated with its respective search area 2B, the correlation surface shown in FIG. 9 is produced, in which the search block 2A correlates with the search area 2B at every point in the y-axis direction. There is therefore no single minimum in the correlation surface, and hence the motion between the search block 2A and the search area 2B cannot be determined.

Figure 10:
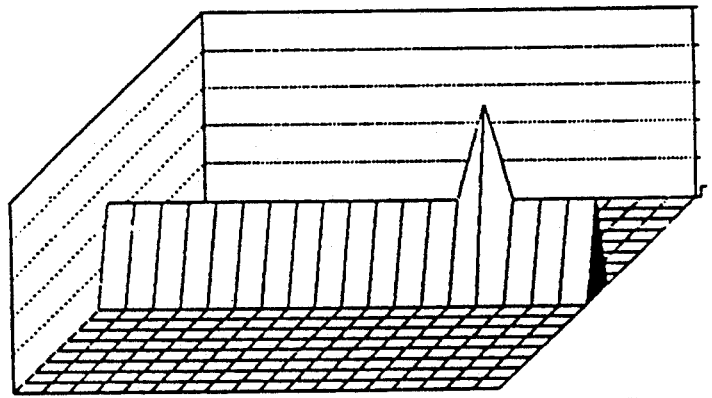

However, now consider the situation if the search block 2A is grown such that it encompasses all three of the original search blocks 1A, 2A and 3A. When the grown search block 2A is correlated with a search area covering the original search areas 1B, 2B and 3B, the resulting correlation surface is as shown in FIG. 10. This shows a single minimum at (5, 0) indicating the correct motion of the original search block 2A. This example illustrates the need for some unique feature in the source video, in order accurately to detect motion. Thus, the search blocks 1A and 3A both had unique vertical and horizontal features that is the edges of the object and hence motion could be determined. In contrast, the search block 2A had a unique vertical feature, but no unique horizontal feature, and hence horizontal motion could not be determined. However, by growing the search block until it encompasses a unique feature both horizontally and vertically, the complete motion for that search block can be determined. Moreover, it can be shown that growing the search block is beneficial when noise in the source video is considered.

Figure 11:
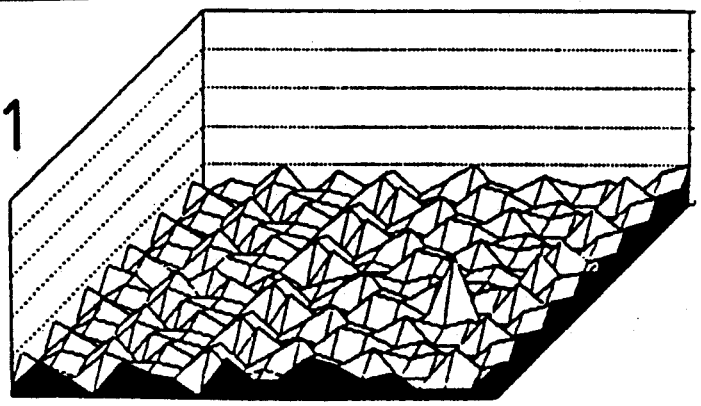
FIGS. 11 and 12 show further examples of correlation surfaces, used in describing a threshold test.
Figure 12:
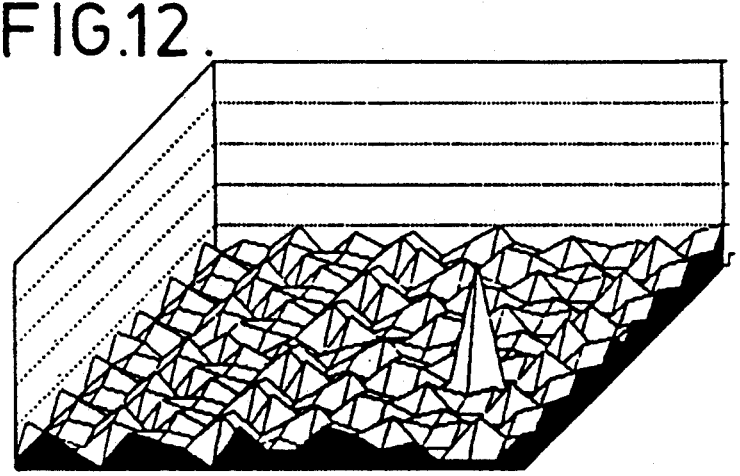

A further example will now be considered with reference to FIG. 11. This shows a correlation surface for a search block where the motion vector is (5, 3). However, due to the numerous other correlations which have taken place between the search block and the search area, the true motion is difficult to detect. An example of source video which might produce such a correlation surface would be a low contrast tree moving with the wind. It is now assumed that the search block and the search area are grown. The growing can take place in the horizontal direction, as in the previous example, or in the vertical direction, or in both directions. Assuming that the neighbouring search blocks have the same motion, the mean effect on the resulting correlation surface will be to increase the magnitude of the minima at (5, 3) by a greater proportion than the magnitude of the other correlation peaks. This is shown in FIG. 12, which indicates that it is then easier to detect the correct motion vector.

The way in which search blocks are grown will now be further considered with reference to FIG. 7. Here it was required to grow the area of the search block 2A to encompass the areas of the search blocks 1A and 3A, and to produce the resulting correlation surface. In fact, the resulting correlation surfaces are produced directly by adding together the elements of the three correlation surfaces corresponding to the search blocks 1A, 2A and 3A. In effect if each correlation surface is considered as a matrix of point magnitudes, then the correlation surface of the enlarged search block 2A is the matrix addition of the correlation surface of the original search blocks 1A, 2A and 3A.

The area of the search block 2A could also be grown vertically by adding correlation surfaces of the search blocks above and below, whilst if the search block 2A is to be grown both horizontally and vertically, then the four neighbouring diagonal correlation surfaces have to he added as well. From this it will be seen that the actual process of growing a search block to encompass neighbouring search blocks is relatively easy, the more difficult process being to decide when growing should take place, and which neighhouring search blocks should be encompassed. Basically, the answer is that the area of the search blocks should be grown until a good minimum or good motion vector is detected. It is therefore necessary to specify when a motion vector can be taken to be a good motion vector, and this can in fact be deduced from the examples given above.

In the example described with reference to FIGS. 7 to 10, it was necessary to grow the search block horizontally in order to encompass a unique horizontal feature of the object, and hence obtain a single minimum. This situation was characterized by a row of identical minima on the correlation surface of FIG. 9, and a single minimum on the correlation surface of FIG. 10. From this the first criteria for a good minimum can be obtained; a good minimum is the point of smallest magnitude on the correlation surface for which the difference between it and the magnitude of the next smallest point exceeds a given value. This given value is known as the threshold value, and hence this test is referred to herein as the threshold test.

It should be noted that the next smallest point is prevented from originating from within the bounds of a further test, described below, and referred to herein as the rings test. In the case of a rings test employing three rings, the next smallest point is prevented from originating from a point within three pixels of the point in question. In the example of FIGS. 7 to 10, the correlation surface of FIG. 9 would have failed the threshold test; the search area 2A is therefore grown and, given a suitable threshold value, the correlation surface of FIG. 10 will pass the threshold test.

The threshold test can also be used to cause growing in the example described above with reference to FIGS. 11 and 12. Prior to growing the search block, the correct minimum is undetectable, due to the closely similar magnitudes of the surrounding points. Given a suitable threshold value, however, the correlation surface will fail the threshold test, and the search block will be grown. As a result, it will then be possible to detect the minimum among the other spurious points.

It will be seen that the use of a threshold is a subjective test, but the correct threshold for the correlation surface under test can be selected by normalizing the threshold as a fraction of the range of magnitudes within the correlation surface. This also lessens the effect of, for example the contrast of the video source.

Figure 13:
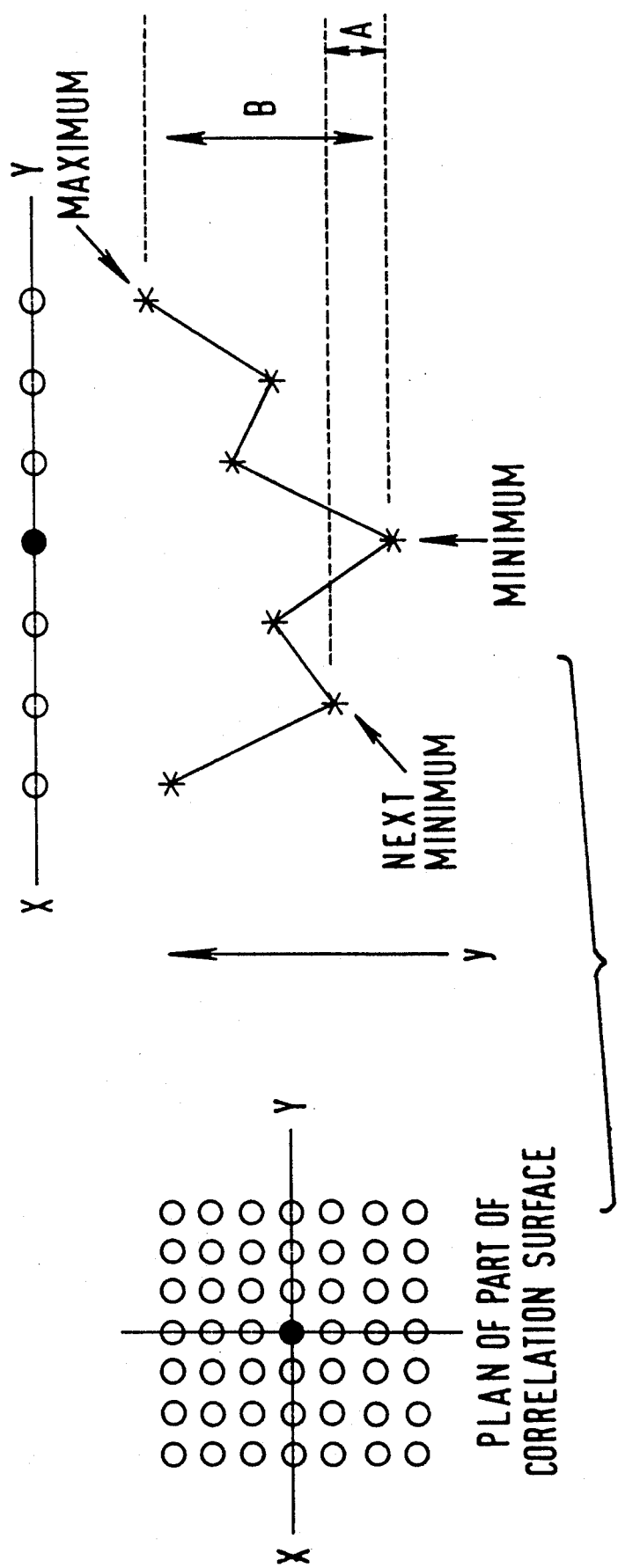
FIG. 13 shows part of a correlation surface for further describing the threshold test.

The threshold test with which the present invention is particularly, but not exclusively, concerned, will now be further described with reference to FIGS. 13 and 14. FIG. 13 shows parts of a correlation surface. On the left is a plan of part of the correlation surface showing an array of points therein. On the right a line X-Y of these points have been extracted from the array, and below this the magnitudes of the differences represented by the points in the line X-Y are marked relative to a y axis. In effect, therefore, this is a cross-section through the correlation surface and it should be noted that in this figure, unlike those showing complete correlation surfaces, there is no inversion, so that the minimum difference is at the bottom. Also shown is the next minimum which is defined as being the point on the correlation surface whose magnitude is greater than or equal to the magnitude of the minimum but less than any other point on the correlation surface. Also shown is the maximum which is defined as being the point on the correlation surface whose magnitude is greater than he magnitude of any other point on the correlation surface.

The threshold test requires a threshold value to be defined. For the purpose of this example the normal threshold value will be considered to be 12.5 percent.

In order to pass the threshold test the following condition must be satisfied:

the absolute difference (A in FIG. 13) between the magnitude of the minimum and the magnitude of the next minimum must be greater than the given threshold value percentage of the absolute difference (B in FIG. 13) between the magnitude of the minimum and the magnitude of the maximum.

In other words, A (the difference between the minimum and the next minimum) must be greater than 12.5 percent of B (the difference between the minimum and the maximum).

Figure 14A:
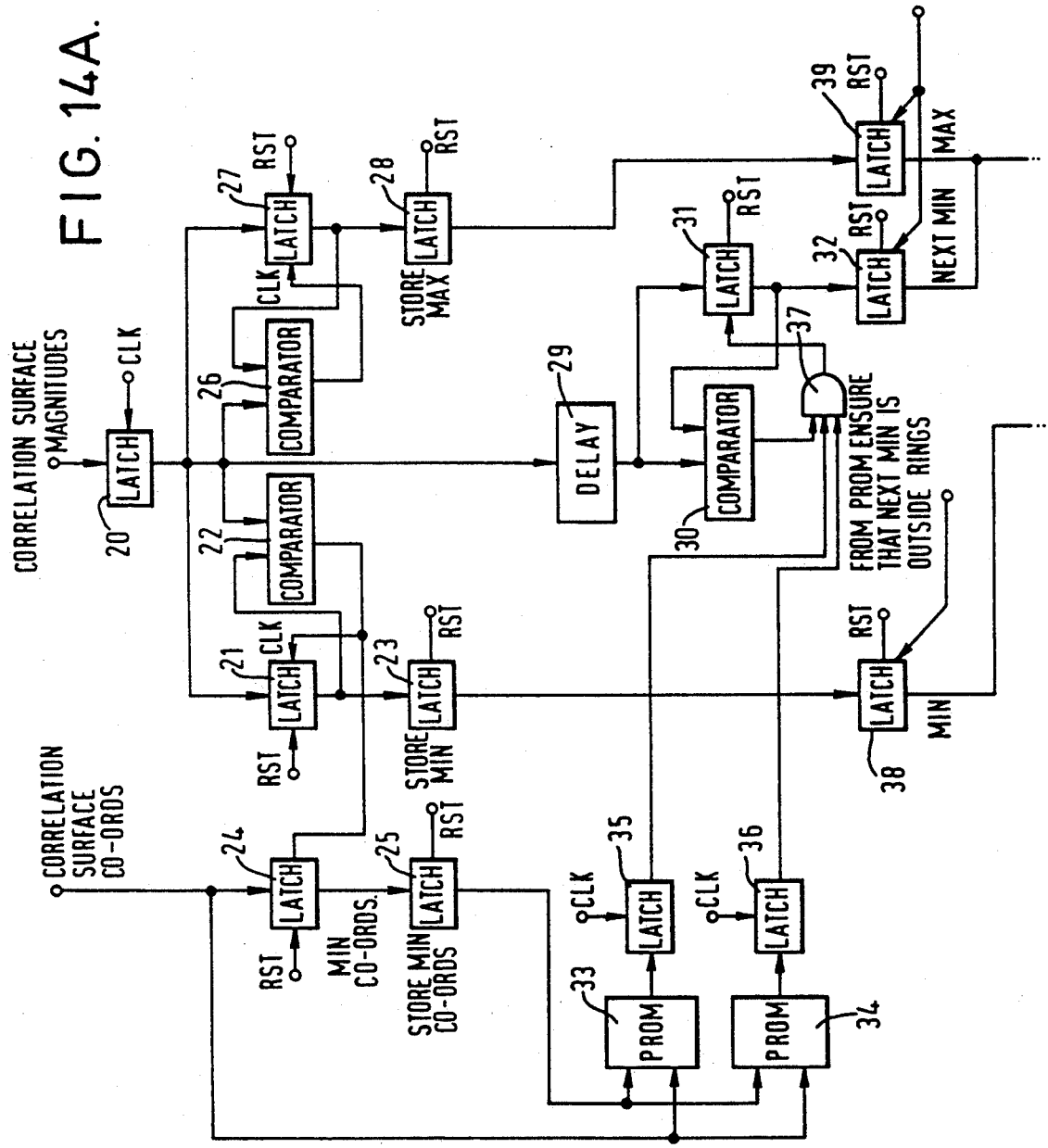

The threshold test will now be further described with reference to FIG. 14 (made up of FIGS. 14A and 14B)

which shows a circuit arrangement for carrying out the threshold test and comprising latch circuits 20, 21, 23 to 25, 27, 28, 31, 32, 35, 36, 38, 39, 41, 42, 44, 45 and 47, comparators 22, 26, 30 and 46, a delay 29, programmable read only memories (PROMs) 33 and 34, a logic gate 37, an adder 40, and a barrel rotator circuit 43 interconnected as shown and operating as will be described below.

The first step in the threshold test is to determine the minimum, next minimum and maximum points on the correlation surface. The correlation surface magnitudes are latched into the circuit arrangement by the latch circuit 20 from which they are passed to the latch circuits 21 and 27, to the comparators 22 and 26, and to the delay 29.

The minimum point is determined using the latch circuits 21 and 23 and the comparator 22. The latch circuit 21 is reset at the beginning of each new correlation surface, to supply a maximum binary value (11.1). The output of the latch circuit 21 is used as an input to the comparator 22, which compares it against each incoming magnitude of the correlation surface. If the incoming magnitude is less than or equal to the output of the latch circuit 21, then the output of the comparator 22 is asserted. This is used to clock the latch circuit 21, and hence latch the incoming magnitude. This is then the new minimum and is passed to the input of the comparator 22 for comparison against subsequent magnitudes. After the last magnitude of the correlation surface has been compared, the latch circuit 21 will hold the magnitude of the minimum point on the correlation surface. This magnitude is latched into the latch circuit 23 using the reset pulse generated at the beginning of each correlation surface.

The output of the comparator 22 is also used to clock the latch circuit 24 which receives the X and Y correlation surface coordinates of the incoming magnitude, and hence will hold, after the last magnitude, the coordinates of the minimum point on the correlation surface.

The maximum is simultaneously determined in a very similar manner using the latch circuits 27 and 28, and the comparator 26. The only differences are that the latch circuit 27 is reset with a minimum binary value (zero), and that the output of the comparator 26 is asserted when the incoming magnitude is greater than the previously latched maximum. It should also be noted that the coordinates of the maximum are not required.

After one pass of the correlation surface, the values of the minimum, the maximum, and the minimum point coordinates are available at the outputs of the latch circuits 23, 28 and 24 respectively.

The next minimum is defined as being the minimum point on the correlation surface which lies outside the area defined by the rings test surrounding the minimum determined above. Assuming that three rings are used for the rings test, then this means a next minimum which does not come within three points on the correlation surface of the minimum. The required process is similar to that used to determine the minimum, but is disabled in the vicinity of the earlier minimum.

The next minimum is hence determined in a similar manner using the latch circuits 31 and 32 and the comparator 30. The delay in determining the earlier maximum and minimum is compensated for using the delay 29 which is a simple delay element such as a first-in-first-out circuit. The necessary disabling is performed using the PROMs 33 and 34, the latch circuits 35 and 36, and the logic gate 37. The PROMs 33 and 34 receive the coordinates (X and Y) of the minimum and the coordinates of the current correlation surface magnitude. The PROMs 33 and 34 are programmed such that by comparing the two sets of coordinates an output signal is derived when the coordinates of the current magnitude lie within the rings surrounding the earlier minimum. These two signals from the latch circuits 35 and 36 are received by the logic gate 37. When the two signals are present, the comparator 30 is prevented from latching a minimum which is lying in the rings.

After this second pass of the correlation surface, the latch circuit 32 will hold the value of the next minimum. The latch circuits 38 and 39 receive the minimum and maximum from the latch circuits 23 and 28. They are clocked by the correlation surface reset and hence, at the end of the second pass hold the magnitudes of the minimum and maximum. The threshold test proper can now be performed.

Referring also to FIG. 13, the first requirement is to determine the magnitude of the maximum minus the minimum (B), and of the next minimum minus the minimum (A). This is done using the adder 40 and the two latch circuits 41 and 42. One input to the adder 40 is a negative twos complement form of the minimum from the latch circuit 38. The other input is either the next minimum from the latch 32 or the maximum from the latch circuit 39. The enabling of either value into the adder 40 is under external control.

The difference values A and B are calculated in turn. First the latch circuit 39 is enabled into the adder 40 and hence the output of the adder 40 is the difference value B which is latched into the latch circuit 42. This is followed by enabling the latch circuit 32 into the adder 40 and latching the output of the adder 40 into the latch circuit 41 which will then hold the difference value.

The two difference values A and B are then compared. However, the difference value B is multiplied by the given threshold value. This is done using the barrel rotator circuit 43, (which may be an LSH32 from Logic Devices Incorporated) under the control of the threshold value determined as described in detail below. Using a barrel rotator circuit limits the threshold values which it is possible to select to, for example, 50 percent, 25 percent or 12.5 percent, but more complex hardware comprising multipliers can be used to enable other figures to be used, and in particular smaller step changes in the threshold value to be made. The multiplied difference value B is then latched into the latch circuit 45 and the difference value A is aligned with it using the latch circuit 44. These two difference values A and B are then compared using the comparator 46. If the difference value A is greater than the multiplied difference value B, then the threshold test has been passed. Otherwise a failure is recorded. In either case the result of the comparison is latched by the latch circuit 47 for use in further processing.

Figure 15:
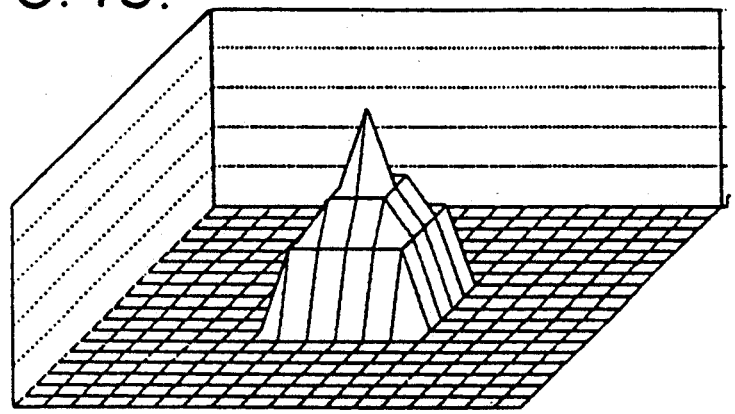
FIGS. 15 and 16 show still further examples of correlation surfaces, used in describing a rings test.
Figure 16:
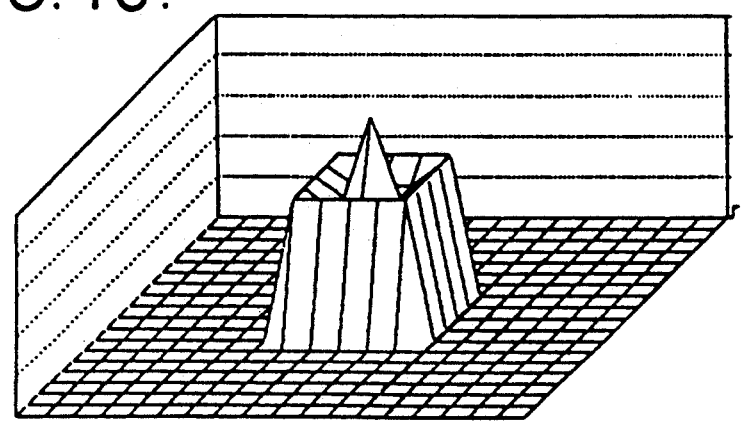

The rings test, referred to briefly above, will now be further described. The basis of the rings test is to assume that a good minimum (or maximum) will have points of increasing (or decreasing) magnitudes surrounding it. FIG. 15 illustrates this assumption, showing a minimum at (0, 0) where the surrounding three rings of points have decreasing mean magnitude. This is as opposed to the correlation surface shown in FIG. 16, where the rings, and in particular the second inner-most ring, are not of decreasing mean magnitude.

In this case the criteria for a good minimum as defined by the rings test, is that the average slope is monotonic. Therefore for a pre-defined number of rings of points surrounding the minimum in question, the mean magnitude of each ring when moving from the innermost ring outwards, must be greater than that of the previous ring. Returning again to the example described with reference to FIGS. 7 to 10, it will be seen from FIGS. 9 and 10 that the correlation surface of FIG. 9 would have failed the rings test, but that the correlation surface of FIG. 10 would have passed the rings test. Since the rings test compares mean, and not absolute, magnitudes, it is less subjective than the threshold test, and indeed the only variable in the rings test is the number of rings considered.

Having described the mechanism for growing a search block, it is now necessary to consider how by examining the shape of the correlation surface it is possible to determine the most effective direction in which the search block should grow.

Referring again to FIG. 9, this correlation surface resulted where there was a unique vertical feature, but no unique horizontal feature. This is mirrored in the correlation surface by the minimum running horizontally across the correlation surface, due to the multiple correlations in this direction. From this it can be deduced that the search block should be grown horizontally. Conversely, should a line of multiple correlations run vertically, this would indicate the need to grow the search block vertically, whilst a circular collection of multiple correlations would indicate a need to grow the search block both horizontally and vertically.

Using this criteria, a quantitative measure of the shape of the correlation surface is required in order to determine in which direction the search block should be grown. This measure is determined as follows. Firstly, a threshold is determined. Any point on the correlation surface below the threshold is then considered. This threshold, like that used in the threshold test, is normalized as a fraction of the range of magnitudes within the correlation surface. Using this threshold, the points on the correlation surface are examined in turn in four specific sequences. In each, the point at which the correlation surface value falls below the threshold is noted. Those four sequences are illustrated diagrammatically in FIG. 17 in which the numbers 1, 2, 3 and 4 at the top, bottom, left and right refer to the four sequences, and the hatched area indicates points which fall below the threshold:

Sequence 1

Search from the top of the correlation surface down for a point A which falls below the threshold.

Sequence 2

Search from the bottom of the correlation surface up for a point C which falls below the threshold.

Sequence 3

Search from the left of the correlation surface to the right for a point D which falls below the threshold.

Sequence 4

Search from the right of the correlation surface to the left for a point B which falls below the threshold.

The locations of the four resulting points A, B, C and D are used to calculate the two dimensions X and Y indicated in FIG. 17, these dimensions X and Y indicating the size of the hatched area containing the points falling below the threshold value. Hence from the dimensions X and Y, it can be deduced whether the shape is longer in the x rather than the y direction, or vice versa, or whether the shape is approximately circular. A marginal difference of say ten percent is allowed in deducing the shape, that is, the dimension X must be a minimum of ten percent greater than the dimension Y for the shape to be considered to be longer in the x direction. Similarly for the y direction. If the dimensions X and Y are within ten percent of each other, then the shape is considered to be circular, and the search block is grown in both directions. In the example of FIG. 17 the dimension X is greater than the dimension Y, and hence the search block is grown in the x or horizontal direction.

The growing of the search block continues until one or more growth limitations is reached. These limitations are: that the minimum in the correlation surface passes both the threshold test and the rings test; that the edge of the video frame is reached; or that the search block has already been grown a predetermined number of times horizontally and vertically. This last limitation is hardware dependent. That is to say, it is limited by the amount of processing that can be done in the available time. In one specific embodiment of apparatus according to the present invention, this limit was set at twice horizontally and once vertically.

If the minimum in the correlation surface passes both the threshold test and the rings test, then it is assumed that a good motion vector has been determined, and can be passed to the motion vector reducer 5 (FIG. 1). However, if the edge of the frame is reached or the search block has already been grown a predetermined number of times both horizontally and vertically, then it is assumed that a good motion vector has not been determined for that particular search block, and instead of attempting to determine a good motion vector, the best available motion vector is determined by weighting.

The correlation surface is weighted such that the selection of the best available motion vector is weighted towards the stationary, that is the centre, motion vector. This is for two reasons, firstly, if the search block, even after growing, is part of a large plain area of source video, it will not be possible to detect a good motion vector. However, since the source video is of a plain area, a stationary motion vector will lead to the correct results in the subsequent processing. Secondly, weighting is designed to reduce the possibility of a seriously wrong motion vector being passed to the motion vector reducer 5 (FIG. 1). This is done because it is assumed that when a good motion vector cannot be determined, a small incorrect motion vector is preferable to a large incorrect motion vector.

FIG. 18 shows an example of how the weighting function can be applied to the correlation surface. In this example, the weight applied to a given point on the correlation surface is directly proportional to the distance of that point from the stationary centre motion vector. The magnitude of the point on the correlation surface is multiplied by the weighting factor. For example, the gradient of the weighting function may be such that points plus or minus 32 pixels from the centre, stationary motion vector are multiplied by a factor of three. In other words, as shown in FIG. 18, where the centre, stationary motion vector is indicated by the black circle, the weighting function is an inverted cone which is centred on the centre, stationary motion vector.

After the correlation surface has been weighted, it is again passed through the threshold test and the rings test. If a minimum which passes both these tests is determined, then it is assumed that this is a good motion vector, and it is flagged to indicate that it is a good motion vector, but that weighting was used. This flag is passed, together with the motion vector to the motion vector reducer 5 (FIG. 1). If on the other hand, neither a good motion vector nor a best available motion vector can be determined, even after weighting, then a flag is set to indicate that any motion vector passed to the motion vector reducer 5 (FIG. 1) for this search block is a bad motion vector. It is necessary to do this because bad motion vectors must not be used in the motion vector reduction process, but must be substituted as will be described below.

Thus, in summary, the operation of the motion vector estimator 4 (FIG. 1) is to derive from the correlation surface generated by the direct block matcher 3 (FIG. 1), the point of best correlation, that is the minimum. This minimum is then subjected to the threshold test and the rings test, both of which the minimum must pass in order for it to be considered to represent the motion of the search block. It should, incidentally, be noted that the threshold used in the threshold test and the rings test may be either absolute values or fractional values. If the minimum fails either test, then the search block is grown, a new minimum is determined, and the threshold test and the rings test re-applied. The most effective direction in which to grow the search block is determined from the shape of the correlation surface.

Referring initially to FIG. 1, the process of motion vector reduction will now be described. Using a HDVS, each search block is assumed to be 32 pixels by 23 lines, which can be shown to lead to a possible maximum of 2451 motion vectors. The choice of the search block size is a compromise between maintaining resolution and avoiding an excessive amount of hardware. If all these motion vectors were passed to the motion vector selector 6, the task of motion vector selection would not be practicable, due to the amount of processing that would be required. To overcome this problem, the motion vector reducer 5 is provided between the motion vector estimator 4 and the motion vector selector 6. The motion vector reducer 5 takes the motion vectors that have been generated by the motion vector estimator 4 and presents the motion vector selector 6 with only, for example, four motion vectors for each search block in the frame, including those in border regions, rather than all the motion vectors derived for that frame. The effect of this is two-fold. Firstly, this makes it much easier to choose the correct motion vector, so long as it is within the group of four motion Vectors passed to the motion vector selector 6. Secondly, however, it also means that if the correct motion vector is not passed as one of the four, then the motion vector selector 6 is not able to select the correct one. It is therefore necessary to try to ensure that the motion vector reducer 5 includes the correct motion vector amongst those passed to the motion vector selector 6. It should also be mentioned that although our motion vectors are passed by the motion vector reducer 5 to the motion vector selector 6, only three of these actually represent motion, the fourth motion vector always being the stationary motion vector which is included to ensure that the motion vector selector 6 is not forced into applying a motion vector representing motion to a stationary pixel. Other numbers of motion vectors can be passed to the motion vector selector 6, for example, in an alternative embodiment four motion vectors representing motion and the stationary motion vector may be passed.

Hereinafter the term 'sample block' refers to a block in a frame of video in which each pixel is offered the same four motion vectors by the motion vector reducer 5. Thus, a sample block is the same as a search block before the search block has been grown, and in a frame of video the initial positions of the sample blocks and the search blocks are the same.

The motion vector reducer 5 (FIG. 1) receives the motion vectors and the flags from the motion vector estimator 4 (FIG. 1) and determines the quality of the motion vectors by examining the flags. If the motion vector was not derived from an ambiguous surface, that is there is a high degree of confidence in it, then it is termed a good motion vector, but if a certain amount of ambiguity exists, then the motion vector is termed a bad motion vector. In the motion vector reduction process, all motion vectors classed as bad motion vectors are ignored, because it is important that no incorrect motion vectors are ever passed to the motion vector selector 6 (FIG. 1), in case a bad motion vector is selected thereby. Such selection would generally result in a spurious dot in the final picture, which would be highly visible.

Each of the motion vectors supplied to the motion vector reducer 5 (FIG. 1) was obtained from a particular search block, and hence a particular sample block, the position of these being noted together with the motion vector. Because any motion vectors which have been classed as bad motion vectors are ignored, not all sample blocks will have a motion vector derived from the search block at that position. The motion vectors which have been classed as good motion vectors, and which relate to a particular search block, and hence a particular sample block, are called local motion vectors, because they have been derived in the area from which the sample block was obtained. In addition to this, another motion vector reduction process counts the frequency at which each good motion vector occurs, with no account taken of the actual positions of the search blocks that were used to derive them. These motion vectors are then ranked in order of decreasing frequency, and are called common motion vectors. In the worst case only three common motion vectors are available and these are combined with the stationary motion vector to make up the four motion vectors to be passed to the motion vector selector 6 (FIG. 1). However, as there are often more than three common motion vectors, the number has to be reduced to form a reduced set of common motion vectors referred to as global motion vectors.

A simple way of reducing the number of common motion vectors is to use the three most frequent common motion vectors and disregard the remainder. However, the three most frequent common motion vectors are often those three motion vectors which were initially within plus or minus one pixel motion of each other vertically and/or horizontally. In other words, these common motion vectors were all tracking the same motion with slight differences between them, and the other common motion vectors, which would have been disregarded, were actually tracking different motions.

In order to select the common motion vectors which represent all or most of the motion in a scene, it is necessary to avoid choosing global motion vectors which represent the same motion. Thus, the strategy actually adopted is first to take the three most frequently occurring common motion vectors and check to see if the least frequent among them is within plus or minus one pixel motion vertically and/or plus or minus one pixel motion horizontally of either of the other two common motion vectors. If it is, then it is rejected, and the next most frequently occurring common motion vector is chosen to replace it. This process is continued for all of the most frequently occurring common motion vectors until there are either three common motion vectors which are not similar to each other, or until there are three or less common motion vectors left. However, if there are more than three common motion vectors left, then the process is repeated this time checking to see if the least frequent among them is within plus or minus two pixel motion vertically and/or plus or minus two pixel motion horizontally of another, and so on at increasing distances if necessary. These three common motion vectors are the required global motion vectors, and it is important to note that they are still ranked in order of frequency.

Figures 19, 20:
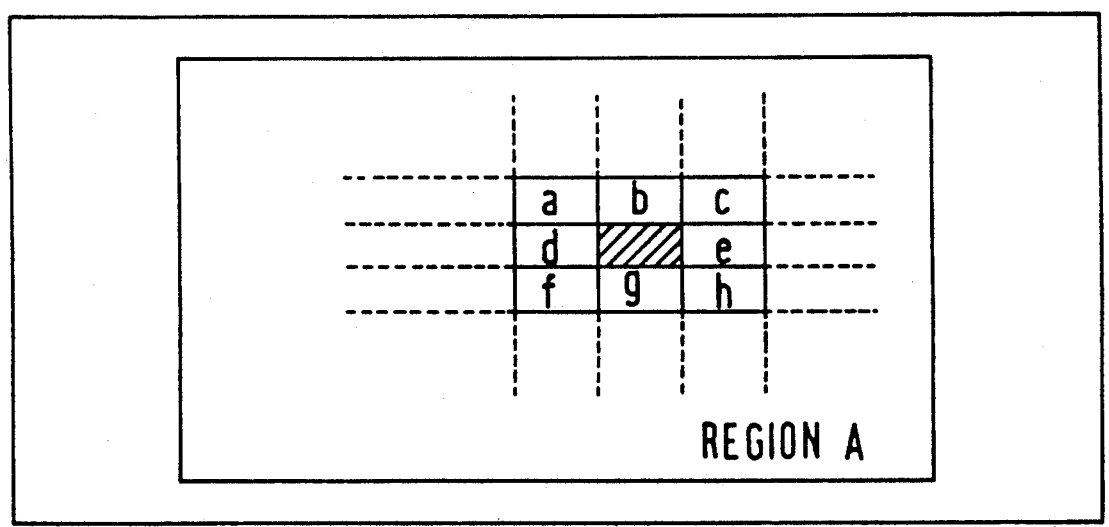
FIG. 19 shows motion vector regions in a frame of video.
FIGS. 20 to 22 show diagrams used in explaining motion vector reduction in respective regions of a frame of video.

When considering the motion vector reduction process and the sample blocks of a frame of video, it is necessary to look at three different types of sample blocks. These types are related to their actual position in a frame of video, and are shown in FIG. 19 as regions. Region A comprises sample blocks which are totally surrounded by other sample blocks and are not near the picture boundary. Region B contains sample blocks which are partially surrounded by other sample blocks and are not near the picture boundary. Finally, region C contains sample blocks which are near the picture boundary. The motion vector reduction algorithm to be used for each of these regions is different. These algorithms will be described below, but firstly it should be reiterated that there exist good motion vectors for some of the sample blocks in the frame of video, and additionally there are also three global motion vectors which should represent most of the predominant motion in the scene. A selection of these motion vectors is used to pass on three motion vectors together with the stationary motion vector for each sample block.

FIG. 20 illustrates diagrammatically motion vector reduction in the region A. This is the most complex region to deal with, because it has the largest number of motion vectors to check. FIG. 20 shows a central sample block which is hatched, surrounded by other sample blocks a to h. Firstly, the locally derived motion vector is examined to see if it was classed as a good motion vector. If it was, and it is also not the same as the stationary motion vector, then it is passed on. However, if it fails either of these tests, it is ignored. Then the motion vector associated with the sample block d is checked to see if it was classed as a good motion vector. If it was, and if it is neither the same as any motion vector already selected, nor the same as the stationary motion vector, then it too is passed on. If it fails any of these tests then it too is ignored. This process then continues in a similar manner in the order e, b, g, a, h, c and f. As soon as three motion vectors, not including the stationary motion vector, have been obtained, then the algorithm stops, because that is all that is required for motion vector selection for that sample block. It is, however, possible for all the above checks to be carried out without three good motion vectors having been obtained. If this is the case, then the remaining spaces are filled with the global motion vectors, with priority being given to the more frequent global motion vectors.

Figure 21:
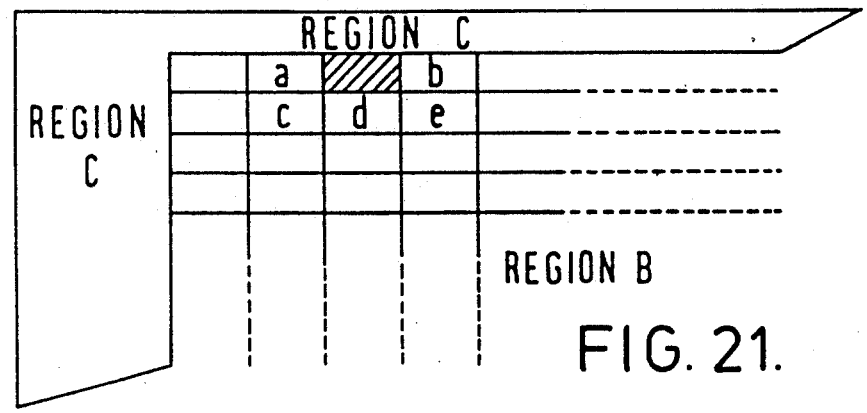

FIG. 21 illustrates motion vector reduction in the region B. Sample blocks in the region B are the same as those in the region A, except that they are not totally surrounded by other sample blocks. Thus the process applied to these sample blocks is exactly the same as those for the region A, except that it is not possible to search in all the surrounding sample blocks. Thus as seen in FIG. 21, it is only possible to check the motion vectors for the sample blocks a to e, and any remaining spaces for motion vectors are filled, as before, with global motion vectors. Likewise, if the hatched sample block in FIG. 21 were displaced two positions to the left, then it will be seen that there would only be three adjacent surrounding blocks to be checked before resorting to global motion vectors.

Figure 22:
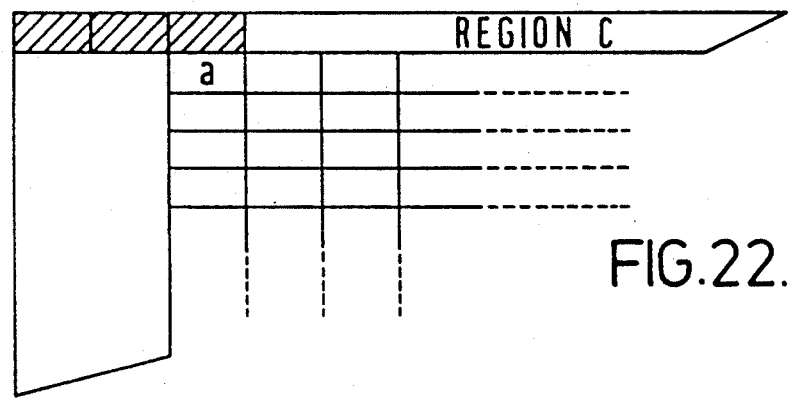

FIG. 22 illustrates motion vector reduction in the region C. This is the most severe case, because the sample blocks neither have a locally derived motion vector nor do they have many surrounding sample blocks whose motion vectors could be used. The simplest way of dealing with this problem is simply to give the sample blocks in the region C the global motion vectors together with the stationary motion vector. However, this is found to produce a block-like effect in the resulting picture, due to the sudden change in the motion vectors presented for the sample blocks in the region C compared with adjoining sample blocks in the region B. Therefore a preferred strategy is to use for the same blocks in the region C the sample motion vectors as those used for sample blocks in the region B, as this prevents sudden changes. Preferably, each sample block in the region C is assigned the same motion vectors as that sample block in the region B which is physically nearest to it. Thus, in the example of FIG. 22, each of the hatched sample blocks in the region C would be assigned the same motion vectors as the sample block a in the region B, and this has been found to give excellent results.

Referring again to FIG. 1, the purpose of the motion vector selector 6 is to assign one of the four motion vectors supplied thereto to each individual pixel within the sample block. However, before moving on to this, the threshold test described above, and with which the present invention is particularly, but not exclusively, concerned, will be still further described with reference to FIGS. 23 and 24.

As described above, each sample block has had assigned to it four motion vectors, consisting of the stationary motion vector, up to three good motion vectors, and the balance, if any, global motion vectors. In the example given above, the threshold value used in the threshold test was 12.5 percent, this value having been chosen to yield the subjectively best results with the average scene content of the program material. In fact, however, in this embodiment, the threshold value is varied in a manner to be described. This variation is effected because any fixed threshold value is necessarily a compromise which for some program material will be too high. The consequence of this will be that relatively few good motion vectors are supplied by the motion vector reducer 5; heavy reliance being placed on global motion vectors. Conversely, for other program material the threshold value will be too low, and the consequence of this will be that relatively many good motion vectors are supplied by the motion vector reducer 5; little reliance being placed on global motion vectors.

Whilst at first sight this latter situation might be thought to be acceptable, in practice it probably means that the good motion vectors being passed have a relatively high level of uncertainty.

In addition to variations in the program material, there are other factors which have a similar effect. Thus, if the input signal is being derived from a charge coupled device (CCD) video camera, which produces a video signal of relatively high resolution, then a lower threshold level is acceptable.

Figure 23:
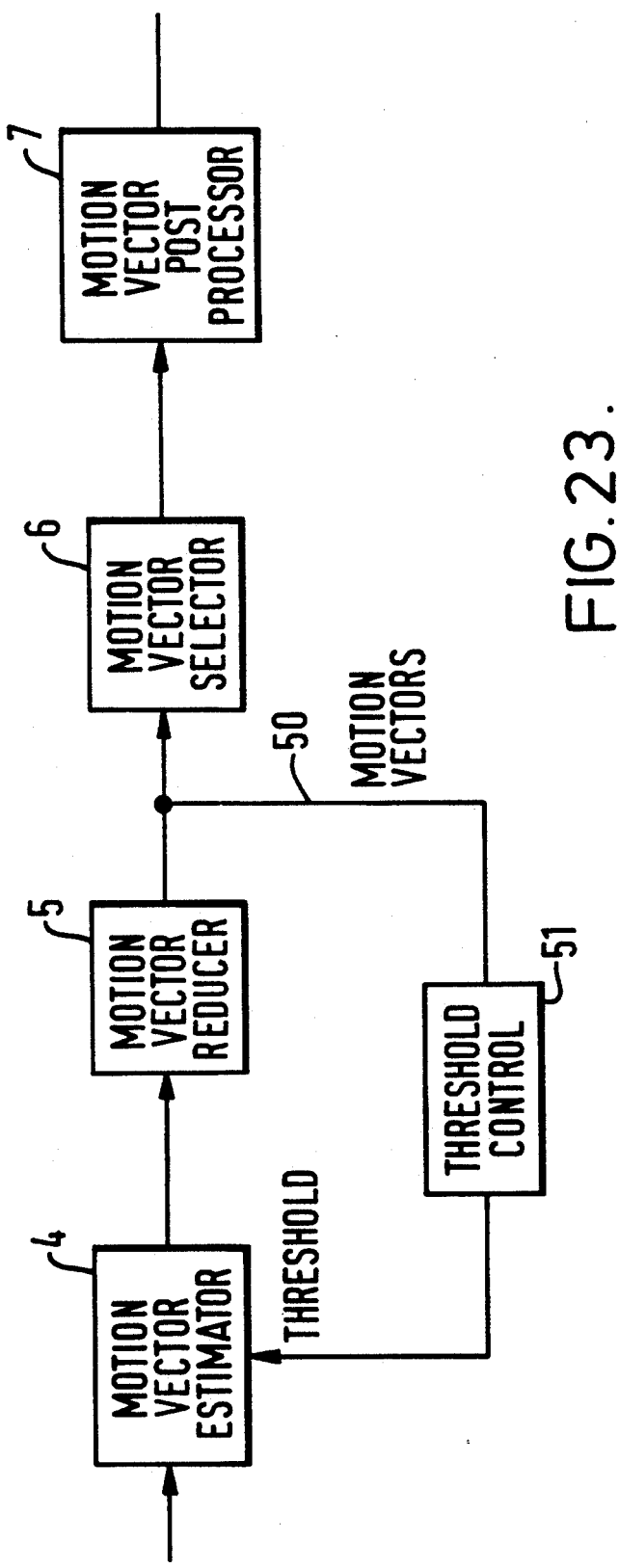
FIGS. 23 and 24 show part of the embodiment in more detailed block diagrammatic form.

This problem is solved in the embodiment by providing an auto-threshold in the motion vector estimation process. As shown in FIG. 23, a feedback path 50 is provided from the output of the motion vector reducer 5 via a threshold control 51 to the motion vector estimator 4. The threshold control 51 operates continuously to adapt the threshold value to keep the number of good motion vectors, that is the number passing the threshold test, within prescribed limits.

To be able to adjust the threshold value, the number of good motion vectors supplied by the motion vector reducer 5 is continuously counted and averaged over a few fields or frames. If the average number of good motion vectors per field or frame is outside the maximum and minimum prescribed limits for that material, then the threshold level is altered accordingly. The feedback path 50 contains hysteresis to avoid the threshold level oscillating, and also limits the maximum rate of change of the threshold value in both directions.

At least some of the parameters that control the characteristics of the feedback path 50, that is:

1. The number of fields or frames over which the vector count is averaged.
2. The amount of hysteresis present in the feedback path
3. The maximum permitted rate of change of the threshold value. are preferably obtained from lookup tables stored in PROMs in the threshold control 51.

In addition, when the number of motion vectors supplied by the motion vector reducer 5 is extremely low, then this is flagged to the motion vector selector 6, which is then forced to revert to non-motion compensated standards conversion, that is, operation using the stationary motion vector in all positions.

The motion vector reducer 5, the motion vector selector, and the motion vector post processor 7 and the interpolator 8 (FIG. 1) can operate with the same threshold level for the whole of each video field, or alternatively, each video field can be split into segments, and the threshold value is then adjusted to an optimum value for each segment.

Figure 24:
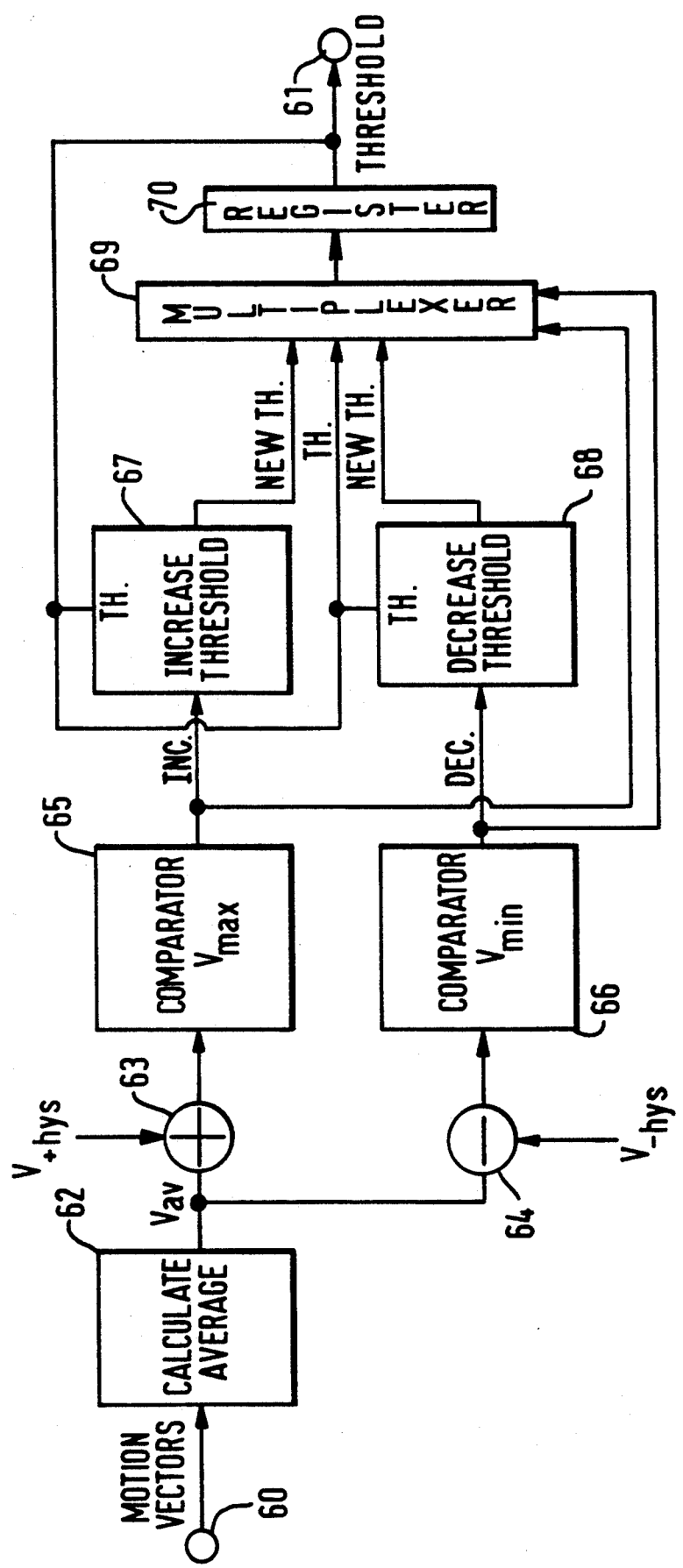

The threshold control 51, shown in more detail in FIG. 24, to which reference is now made, comprises an input 60 to which the motion vectors from the motion vector reducer 5 are supplied, and an output 61 from which a threshold value derived by the threshold control 51 is fed back to the motion vector estimator 4. The threshold control 51 further comprises an average calculator 62, an adder 63, a subtractor 64, two comparators 65 and 66, a threshold increase device 67, a threshold decrease device 68, a multiplexer 69 and a register 70, connected as shown and operating as will now be briefly further described.

The average calculator 62 continuously calculates a running average of the number of good motion vectors per predetermined number of fields or frames. This predetermined number may be preset or may be derived from a PROM in dependence on the video material. The resulting average signal $V_{av}$ is supplied to the adder 63 and the subtractor 64 together with signals $V_{+hys}$ and $V_{-hys}$, respectively, derived from a PROM, and which set the positive and negative hysteresis. The resulting outputs are then compared with $V_{max}$ and $V_{min}$, which define the prescribed limits, in the comparators 65 and 66, respectively. If the average signal $V_{av}$ is outside the upper limit, an increase signal INC is supplied to the threshold increase device 67, and if the average signal $V_{av}$ is outside the lower limit, a decrease signal DEC is supplied to the threshold decrease device 68. The signals DEC and INC are also supplied to respective control terminals of the multiplexer 69, so that in the presence of the signal DEC a new lower threshold value is supplied to the register 70 and thence to the output 61, in the presence of the signal INC a new higher threshold value is supplied to the register 70 and thence to the output 61, and in the absence of both the signals DEC and INC an unchanged threshold value is supplied to the register 70 and thence to the output 61. The register 70 is triggered at the required intervals, for example, once per segment of a field, once per field, or once per frame.

In use, the operator merely defines the type of video material, for example a football match (characterized by rapid pans), a stage drama (characterized by limited pans and relatively slow movements), etc., and the PROMs automatically supply the appropriate parameters to the threshold control 51. Thus the selection of the parameters does not require subjective selection by the operator, but can be predetermined, after if necessary exhaustive system testing, for different types of video material.

Referring again to FIG. 1, the purpose of the motion vector selector 6 is to assign one of the four motion vectors supplied thereto to each individual pixel within the sample block. In this way the motion vectors can be correctly mapped to the outline of objects. The way in which this assignment is effected is particularly intended to avoid the possibility of the background surrounding fine detail from producing a better match than that produced by the correct motion vector. To achieve this the motion vector selection process is split into two main stages. In the first stage, motion vectors are produced for each pixel in the input frames. In other words, there is no attempt to determine the motion vector values for pixels at the output frame positions. The second stage uses the motion vector values produced by the first stage to determine the motion vector value for each pixel in the output frame.

Figure 25:
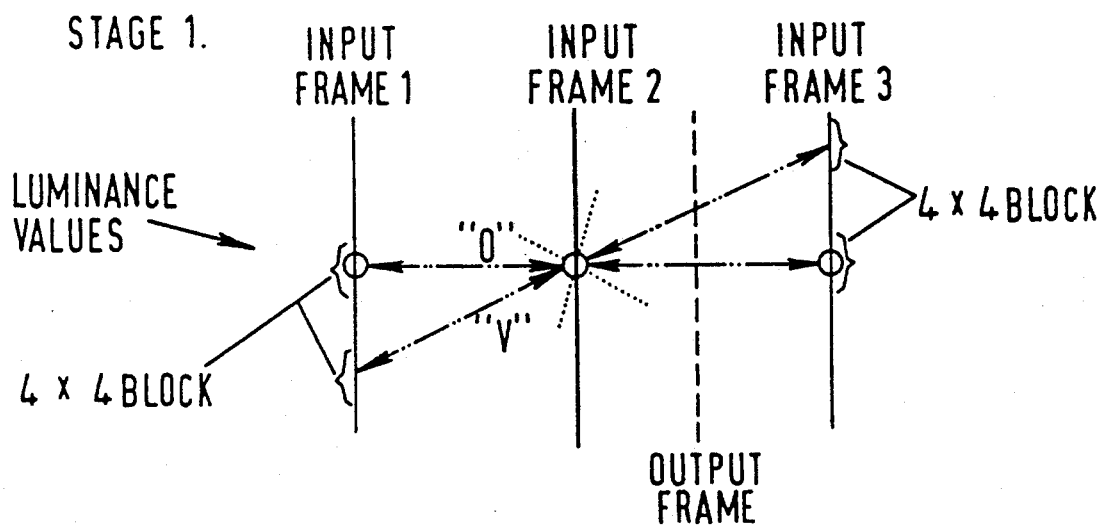
FIGS. 25 and 26 show diagrammatically a first stage in motion vector selection.

Referring now to FIG. 25, each pixel of the input frame 2 is tested for the best luminance value match with the previous and following input frames 1 and 3 of video data, using each of the four motion vectors supplied. The pixel luminance difference is determined as:

$$\sum_{m=0}^{4} \sum_{n=0}^{4} |P1_{nm} - P2_{nm}| + \sum_{m=0}^{4} \sum_{n=0}^{4} |P2_{nm} - P3_{nm}|$$

where:

$P1_{nm}$ is the luminance value of a frame 1 pixel within a 4×4 block of pixels surrounding the pixel whose location is obtained by subtracting the coordinates of the motion vector being tested from the location of the pixel being tested in frame 2

$P2_{nm}$ is the luminance value of a frame 2 pixel within a 4×4 block of pixels surrounding the pixel being tested $P3_{nm}$ is the luminance value of a frame 3 pixel within a 4×4 block of pixels surrounding the pixel whose location is obtained by adding the coordinates of the motion vector being tested to the location of the pixel being tested in frame 2

The minimum pixel difference then indicates the best luminance match and therefore the correct motion vector applicable to the pixel being tested. If the correct motion vector is not available, or there are uncovered or covered areas, referred to in more detail below, then a good match may not occur.

The indication of a poor match is achieved when the average pixel difference within the block of pixels being used is above a certain threshold. This threshold is important, because high frequency detail may produce a poor match even when the correct motion vector is tested. The reason for this poor match is the possibility of a half pixel error in the motion vector estimate. To determine what threshold should indicate a poor match, it is necessary to relate the threshold to the frequency content of the picture within the block of data which surrounds the pixel for which the motion vector is required. To achieve this, an auto-threshold value is determined where the threshold value equals half the maximum horizontal or vertical pixel luminance difference about the pixel being tested. To ensure that the threshold value obtained Is representative of the whole block of data which is compared, an average value is obtained for the four central pixels of a 4×4 block used.

Figure 26:
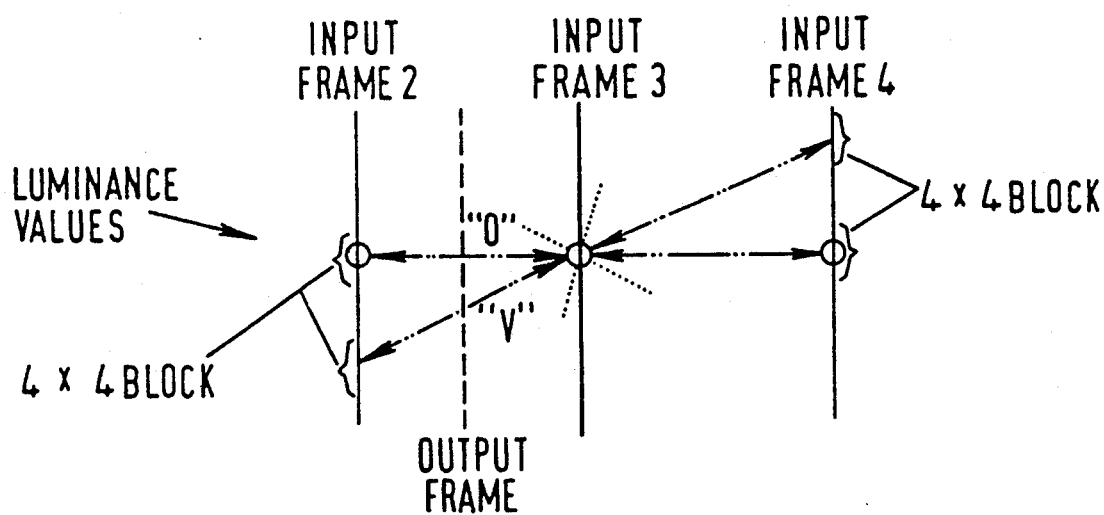

Referring to FIG. 27, which shows a 4×4 block, the required threshold value T is given by:

$$T=(T1+T2+T3+T4)/8$$

where T3, for example, is determined as indicated in FIG. 28 as equal to the maximum of the four pixel luminance difference values comprising;

the two vertical differences: $|B2-B3|$ and $|B4-B3|$, and the two horizontal differences: $|A3-B3|$ and $|C3-B3|$ In this way a frame of motion vectors is obtained for input frame 2, and in a similar manner a frame of motion vectors is obtained for input frame 3 as indicated in FIG. 26.

Apart from scene changes, it is the phenomenon of uncovered/covered surfaces that causes a mis-match to occur in the above first stage of motion vector selection. If an object, say a car, drives into a tunnel, then the car has become covered, while when it drives out, the car is uncovered. If the part of the car that was uncovered in frames 1 and 2 is covered in frames 3 and 4, then the basic vector selection process is not able to determine the correct vector. Moreover, whilst the car going into the tunnel becomes covered, the road and objects behind the car are being uncovered. Likewise the car leaving the tunnel is being uncovered, but the road and objects behind the car are being covered. In general therefore both covered and uncovered objects will exist at the same time. The end of a scene will also have a discontinuation of motion that is similar to an object becoming covered. In an attempt to determine a motion vector even in such circumstances, the luminance value block match is reduced to a two frame match, instead of the three frame match of FIGS. 25 and 26. The frame that the motion vectors are required for (say frame 2) is block-matched individually to the previous and the next frame (frame 1 and frame 3 respectively, in the case of frame 2), using the four motion vectors supplied. The motion vector which produces the best match is chosen as the motion vector applicable to the pixel being tested. In this case, however, a flag is set to indicate that only a two frame match was used.

Particularly with integrating type television cameras, there will be situations where no match occurs. If an object moves over a detailed background, then an integrating camera will produce unique portions of picture where the leading and trailing edges of the object are mixed with the detail of the background. In such circumstances, even the two frame match could produce an average pixel difference above the threshold value. In these cases the motion vector value is set to zero, and an error flag is also set.

The second stage of motion vector selection makes use of the two frames of motion vectors, derived by the first stage. One frame of motion vectors (input frame 2) is considered to be the reference frame, and the following frame to this (input frame 3) is also used. The output frame position then exists somewhere between these two frames of motion vectors. Referring to FIG. 29, for each output pixel position the four possible motion vectors associated with the sample block of input frame 2, are tested. A line drawn through the output pixel position at the angle of the motion vector being tested will point to a position on both the input frame 2 and the input frame 3. In the case of odd value motion vectors, for example, 1, 3 and 5, a point midway between two input frame pixels would be indicated in the case where the output frame is precisely half way between the input frames 1 and 2. To allow for this inaccuracy, and also to reduce the sensitivity to individual pixels, a 3×3 block of motion Vectors is acquired for each frame, centred on the closest pixel position. In effect a block-match is then performed between each of the two 3×3 blocks of motion vectors and a block containing the motion vector being tested. The motion vector difference used represents the spatial difference of the two motion-vector values as given by:

$$\sqrt{((x1 - x2)^2 + (y1 - y2)^2)}$$

where:

x1 and y1 are the Cartesian coordinates of the motion vector in one of the blocks x2 and y2 are the Cartesian coordinates of the motion vector being tested An average vector difference per pixel Is produced as a result of the block match.

A motion vector match is first produced as above using only motion vector values which were calculated using three input frames; that is input frames 1, 2 and 3 for input frame 2 (FIG. 25), and input frames 2, 3 and 4 for input frame 3 (FIG. 26), and the result is scaled accordingly. Preferably there are at least four usable motion vectors in the block of nine. When both the motion vector block of frame 2 and frame 3 can be used, the motion vector difference values are made up of half the motion vector difference value from frame 2 plus half the motion vector difference value from frame 3. Whichever motion vector the minimum motion vector difference value using the above technique is considered to be the motion vector applicable to the output pixel being tested. If the motion vector difference value produced by the three frame match input motion vector (FIGS. 25 and 26) is greater than unity, then a covered or uncovered surface has been detected, and the same process is repeated, but this time ignoring the error flags. That is, the motion vector values which were calculated using two input frames are used. Theoretically this is only necessary for uncovered/covered surfaces, although in fact improvements can be obtained to the picture in more general areas.

If after both of the above test shave been performed, the minimum motion vector match is greater than two, the motion vector value is set to zero, and an error flag is set for use by the motion vector post processor 7 (FIG. 1).

Following motion vector selection, there will almost certainly be in any real picture situation, some remaining spurious motion vectors associated with certain pixels. Such spurious motion vectors are assumed to exist at a point singularity, where a single pixel has a motion vector different from those of all the surrounding pixels; at a horizontal motion vector impulse, where three horizontally aligned pixels have a motion vector different from those of the surrounding pixels; at a vertical motion vector impulse, where three vertically aligned pixels have a motion vector different from those of the surrounding pixels; at a diagonal motion vector impulse where three diagonally aligned pixels have a motion vector different from those of all the surrounding pixels; at a horizontal plus vertical motion vector impulse, where five pixels disposed in an upright cross have a motion vector different from those of all the surrounding pixels; and at a two-diagonal motion vector impulse, where five pixels arranged in a diagonal cross have a motion vector different from those of all the surrounding pixels.

It is assumed that pixel motion vectors which fall into any of the above six categories do not actually belong to a real picture, and are a direct result of an incorrect motion vector selection. If such motion vectors were used during the interpolation process, then they would be likely to cause dots on the final output picture, and it is therefore preferable that such motion vectors be identified and eliminated. This is done using an algorithm which will detect and flag all of the above motion vector groupings.

Having identified the bad motion vectors, it is then necessary to repair them, this also being effected by the motion vector post processor 7 (FIG. 1). Although various methods such as interpolation or majority replacement can be used, it is has been found that in practice simple replacement gives good results.

Figure 30:
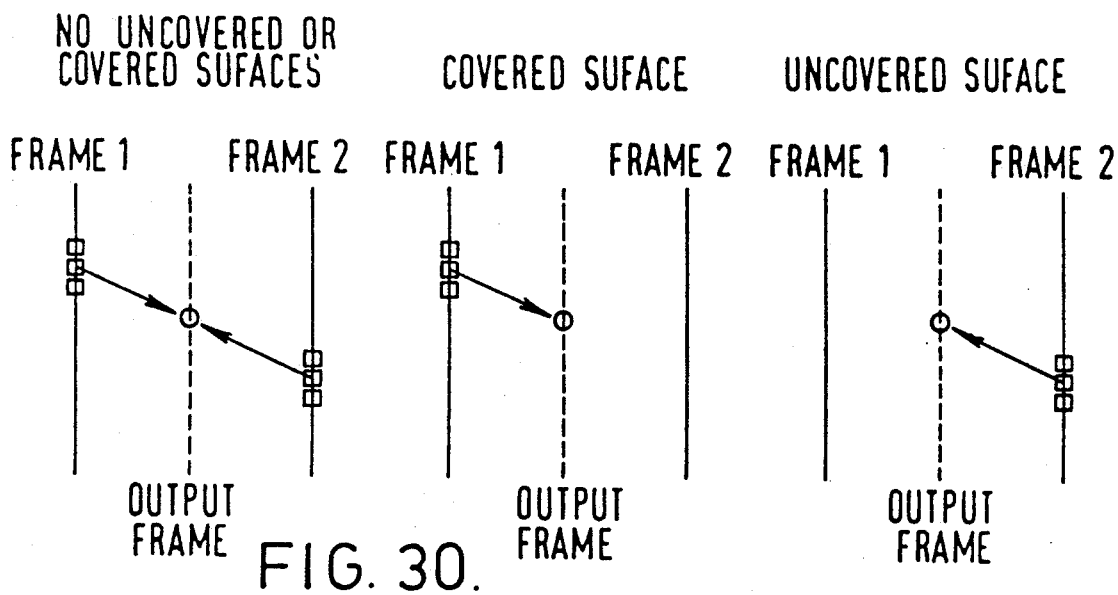
FIG. 30 shows diagrammatically the operation of an interpolator.

Referring again to FIG. 1, the finally selected motion vector for each pixel is supplied by the motion vector post processor 7 to the interpolator 8, together with the progressive scan converted frames at 60 frames per second from the progressive scan converter 2. The interpolator 8 is of relatively simple form using only two progressive scan converted frames, as indicated in FIG. 30. Using the temporal position of the output frame relative to successive input frames, frame 1 and frame 2, and the motion vector for the pixel in the output frame, the interpolator 8 determines in known manner which part of the first frame should be combined with which part of the second frame and with what weighting to produce the correct output pixel value. In other words, the interpolator 8 adaptively interpolates along the direction of movement in dependence on the motion vectors to produce motion compensated progressive scan frames corresponding to 24 frames per second. Although the motion vectors have been derived using only luminance values of the pixels, the same motion vectors are used for deriving the required output pixel chrominance values. An 8×8 array of pixels are used from each frame to produce the required output. Thus the interpolator 8 is a two-dimensional, vertical/horizontal, interpolator and the coefficients used for the interpolator 8 may be derived using the Remez exchange algorithm which can be found fully explained in 'Theory and application of digital signal processing', Lawrence R Rabiner, Bernard Gold. Prentice-Hall Inc., pages 136 to 140 and 227.

FIG. 30 shows diagrammatically the interpolation performed by the interpolator 8 (FIG. 1 for three different cases. The first case, shown on the left, is where there are no uncovered or covered surfaces, the second case, shown in the center, is where there is a covered surface, and the third case, shown on the right, is where there is an uncovered surface. In the case of a covered surface, the interpolation uses only frame 1, whilst in the case of an uncovered surface, the interpolation uses only frame 2.

Provision can be made in the interpolator 8 to default to non-motion compensated interpolation, in which case the temporally nearest progressive scan converted frame is used.

Attention is drawn to the fact that the above-mentioned European patent specification is one of a series of fourteen bearing the numbers EP-A2-0 395 263, EP-A2-0 395 264, EP-A2-0 395 265, EP-A2-0 395 266, EP-A2-0 395 267, EP-A2-0 395 268, EP-A2-0 395 269, EP-A2-0 395 270, EP-A2-0 395 271, EP-A2-0 395 272, EP-A2-0 395 273, EP-A2-0 395 274, EP-A2-0 395 275, and EP-A2-0 395 276. These applications all relate to similar subject matter, similar to that of the present application, and the disclosure in each is incorporated by this reference into the present application.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A motion compensated video standards converter for converting a video signal conforming to a first video standard to a converted video signal conforming to a second video standard, said video signal being provided as a sequence of intervals selected from field and frame intervals, each said interval being arranged in a plurality of blocks each representing a portion of a video image represented by said interval, comprising:

comparing means for comparing a respective one of said blocks in each of a plurality of first intervals of the video signal with a plurality of blocks in a corresponding one of a plurality of adjacent intervals thereof for deriving motion vectors representing motion of the portion of an image represented by said respective one of said blocks between said each of said plurality of first intervals and said corresponding one of said plurality of adjacent intervals by generating a respective correlation surface for said respective one of said blocks in said each of said plurality of first intervals, said correlation surface representing respective differences between the portion of the image represented by said respective one of said blocks in said each of said plurality of first intervals and the respective portions of the image represented by each of said plurality of blocks in said corresponding one of said plurality of adjacent intervals;

selecting means for selecting from each said respective correlation surface a selected motion vector corresponding to a minimum value of said respective differences which differs from a next smallest value of said respective differences represented by said respective correlation surface by more than predetermined threshold value such that a plurality of selected motion vectors are produced for said plurality of first intervals;

averaging means for averaging a number of said plurality of selected motion vectors determined by said selecting means over a predetermined number of said plurality of first intervals to produce an average number;

threshold determining means for determining said predetermined threshold value in dependence on said average number; and interpolator means for producing said converted video signal controlled in dependence on the plurality of selected motion vectors.

2. A motion compensated video standards converter according to claim 1, further comprising means for selecting said predetermined number of said plurality of first intervals over which said averaging means averages said number of said plurality of selected motion vectors in dependence on said video signal.

3. A motion compensated video standards converter according to claim 1, wherein said threshold determining means is operative to determine said predetermined threshold value in accordance with respectively different calculations for increasing and decreasing said predetermined threshold value such that the determination of said predetermined threshold value is subjected to a predetermined hysteresis value selected in accordance with said video signal.

4. A motion compensated video standards converter according to claim 1, wherein said threshold determining means is operative to limit a maximum rate of change of said predetermined threshold value in dependence on said video signal.

5. A motion compensated video standards converter according to claim 1 wherein said comparing means is operative to compare said respective one of said blocks with said plurality of blocks by comparing sums of luminance level differences between said respective one of said blocks and each of said plurality of blocks.

6. A method of deriving motion vectors representing motion between successive intervals of a video signal, said intervals being selected from field and frame intervals, each of said intervals being arranged in a plurality of blocks representing respective portions of a video image represented by said interval, the method including the steps of:

comparing a respective one of the blocks in each of a plurality of first intervals of the video signal with a plurality of blocks in a corresponding one of a plurality of adjacent intervals of the video signal for deriving motion vectors representing motion of the portion of an image represented by said respective one of said blocks between said each of said plurality of first intervals and said corresponding one of said plurality of adjacent intervals;

generating a respective correlation surface for said respective one of said blocks in said each of said plurality of first intervals, said respective correlation surface representing respective differences between the portion of the image represented by said respective one of said blocks in said each of said plurality of first intervals and the respective portions of the image represented by each of said plurality of blocks in said corresponding one of said plurality of adjacent intervals;

for each respective one of said blocks, determining from said respective correlation surface an output motion vector corresponding to a minimum value of said respective differences which differs from a next smallest value of said respective differences represented by said correlation surface by more than a predetermined threshold value such that a plurality of output motion vectors are produced for said plurality of first intervals;

averaging a number of said plurality of output motion vectors over a predetermined number of said plurality of first intervals to produce an average number; and determining said predetermined threshold value in dependence on said average number.

7. A method according to claim 6 wherein the step of averaging a number of said plurality of output motion vectors further comprises selecting said predetermined number of said plurality of first intervals in dependence on said video signal.

8. A method according to claim 6 wherein the step of determining said predetermined threshold value comprises determining said predetermined threshold value in accordance with respectively different calculations for increasing and decreasing said predetermined threshold value such that the determination of said predetermined threshold value is subjected to a predetermined hysteresis value selected in accordance with said video signal.

9. A method according to claim 6 wherein the step of determining said predetermined threshold value comprises limiting a maximum rate of change of said predetermined threshold value in dependence on said video signal.

10. A method according to claim 6 wherein the step of comparing said respective one of said blocks with said plurality of blocks comprises comparing sums of luminance level differences between said respective one of said blocks and each of said plurality of blocks.

* * * * *